United States Patent
Pedersen et al.

(10) Patent No.: US 11,149,388 B1
(45) Date of Patent: Oct. 19, 2021

(54) SLEW DRIVE CONTROL

(71) Applicant: GOMACO Corporation, Ida Grove, IA (US)

(72) Inventors: Scott Pedersen, Rockwell City, IA (US); Steven A. Johnson, Ida Grove, IA (US); Thomas C Farr, Ida Grove, IA (US)

(73) Assignee: GOMACO CORPORATION, Ida Grove, IA (US)

( * ) Notice: Subject to any disclaimer, the term of this patent is extended or adjusted under 35 U.S.C. 154(b) by 0 days.

(21) Appl. No.: 17/337,162

(22) Filed: Jun. 2, 2021

Related U.S. Application Data

(60) Provisional application No. 63/143,606, filed on Jan. 29, 2021.

(51) Int. Cl.
| | | |
|---|---|---|
| *E01C 19/48* | (2006.01) | |
| *B62D 55/065* | (2006.01) | |
| *F16C 17/02* | (2006.01) | |
| *B62D 11/20* | (2006.01) | |

(52) U.S. Cl.
CPC .......... *E01C 19/4893* (2013.01); *B62D 11/20* (2013.01); *B62D 55/065* (2013.01); *F16C 17/02* (2013.01); *E01C 2301/00* (2013.01)

(58) Field of Classification Search
CPC . E01C 19/4893; E01C 2301/00; B62D 11/20; B62D 55/065; F16C 17/02
USPC ................................ 404/84.05–85, 101–118
See application file for complete search history.

(56) References Cited

U.S. PATENT DOCUMENTS

| | | | |
|---|---|---|---|
| 5,101,360 A | 3/1992 | Bennett | |
| 7,681,674 B1 * | 3/2010 | Barnes | B60P 1/00 180/8.1 |
| 9,764,762 B2 * | 9/2017 | Klein | B62D 11/20 |
| 9,969,427 B1 | 5/2018 | Engels et al. | |
| 10,005,489 B2 | 6/2018 | Farr et al. | |
| 10,029,749 B2 | 7/2018 | Guntert et al. | |
| 10,161,088 B2 | 12/2018 | Engels et al. | |
| 10,221,528 B2 | 3/2019 | Dahm et al. | |
| 10,496,106 B2 | 12/2019 | Dahm et al. | |
| 10,589,807 B2 * | 3/2020 | Guntert, Jr. | E01C 19/42 |

(Continued)

FOREIGN PATENT DOCUMENTS

| | | |
|---|---|---|
| CN | 201321074 | 10/2009 |
| CN | 201377545 | 1/2010 |

(Continued)

*Primary Examiner* — Raymond W Addie
(74) *Attorney, Agent, or Firm* — Suiter Swantz pc llo

(57) ABSTRACT

A slew drive includes a bushing interfacing with a drive gear. The bushing resists a load from the drive gear. The bushing includes an aluminum bronze alloy with a high strength. A paving machine includes multiple of the slew drives. The slew drives control an angle of a pivot arm and steering of a track. A method of reducing component failure in the paving machine includes determining an angular position error of the slew drive of the track. If the angular position exceeds a tolerance, a rate-of-change of the angular position is found to determine whether the slew drive is rotating. Where the slew drive is not rotating, the slew drive is driven in a reverse direction to unseize the slew drive. A track drive and the slew drive of the pivot are controlled by a control loop. The slew drive may be dithered to steer a trailing pivot.

30 Claims, 12 Drawing Sheets

(56) References Cited

U.S. PATENT DOCUMENTS

| | | | |
|---|---|---|---|
| 2003/0072613 A1* | 4/2003 | Colvard | B62D 55/062 |
| | | | 404/105 |
| 2018/0073202 A1* | 3/2018 | Dahm | B62D 11/005 |
| 2018/0141597 A1* | 5/2018 | Guntert, Jr. | B62D 7/06 |
| 2020/0255074 A1 | 8/2020 | Guntert, Jr. et al. | |
| 2021/0078553 A1 | 3/2021 | Adeeb et al. | |

FOREIGN PATENT DOCUMENTS

| | | |
|---|---|---|
| GB | 715462 A | 9/1954 |
| JP | H06156306 A | 6/1994 |

* cited by examiner

SLEW DRIVE CONTROL

CROSS-REFERENCE TO RELATED APPLICATION

The present application claims the benefit under 35 U.S.C. § 119(e) of U.S. Provisional Application No. 63/143,606, filed Jan. 29, 2021, which is incorporated herein by reference in the entirety.

TECHNICAL FIELD

Embodiments of the invention are directed generally toward the field of steering and machine configuration controls, and more particularly for controls for pivot mounted leg assemblies.

BACKGROUND

Rotational movements of pivot mounted leg assemblies may be provided by a drive, such as a hydraulic drive in a four-bar linkage configuration or a slew drive. The use of such drives is particularly desirable in various paving machines, such as concrete pavers. In this regard, the paving machines may include significant force or torque requirements which may be provided by the drives. Depending upon the configuration of the drive, the drive may provide up to a full 360-degree rotation or may provide substantially less than 360-degree rotation. In this regard, the slew drive configuration may advantageously provide a greater range of motion than the hydraulic drive in the four-bar linkage configuration. However, the hydraulic drives may more reliably provide a larger output torque than the slew drives. Due to internal gearing, such slew drive assemblies may become over or under driven and may lock-up. Additionally, the slew drives may experience component failures due to impact loading. For example, the slew drives may include a tapered roller bearing which may be subject to failure when axially overloaded, further causing inner or outer bearing race failure.

Therefore, it would be advantageous to provide a device, system, and method that cures the shortcomings described above.

SUMMARY

A paving machine is described, in accordance with one or more embodiments of the present disclosure. In one embodiment the paving machine includes a frame including a slip-form for moving in a first direction of travel for forming a material into a shape. In another embodiment, the paving machine includes at least one end structure supporting at least a portion of the frame. In another embodiment, the end structure includes a height adjustable leg assembly for adjusting a height of the frame relative to the ground. In another embodiment, the end structure includes a lower track section with a track drive for propelling the frame in a first direction. In another embodiment, the end structure includes a slew drive. In another embodiment, the slew drive of the end structure includes at least one of an angle sensor or a pressure transducer. In another embodiment, the paving machine includes a pivot arm pivotably connecting the end structure to the frame. In another embodiment, the paving machine includes a power supply connected to at least the track drive and the first slew drive for supplying power to the track drive and the first slew drive. In another embodiment, the paving machine includes a processor. In another embodiment, the processor is configured, via executable code, to engage the first slew drive in a rotational direction for changing an angle of the lower track section relative to the pivot arm by supplying power from the power supply to the first slew drive. In another embodiment, the processor is configured, via executable code, to determine the slew drive is seized based on measurements from at least one of the angle sensor or the pressure transducer. The processor may determine the slew drive is seized by receiving the angle of the lower track section relative to the pivot arm from the angle sensor and determining that the rate-of-change of the angle is below a rate-of-change tolerance. In another embodiment, the processor is configured, via executable code, to engage the first slew drive in a reverse rotational direction for a time.

A method of reducing component failure in a paving machine is disclosed, in accordance with one or more embodiments of the present disclosure. In one embodiment, the method includes engaging a first slew drive in a rotational direction for changing an angle of a lower track section relative to a pivot arm by supplying power from a power supply to the first slew drive. In another embodiment, the method includes determining the first slew drive is seized based on measurements from at least one of an angle sensor or a pressure transducer, for example, by measuring a drive load, a rate change, or a lock-up. In another embodiment, the method includes engaging the first slew drive in a reverse rotational direction for a time.

A paving machine is disclosed, in accordance with one or more embodiments of the present disclosure. In one embodiment, the paving machine includes a frame including a slip-form for moving in a first direction of travel for forming a material into shape. In another embodiment, the paving machines includes at least one end structure supporting at least a portion of the frame. In another embodiment, the end structure includes a height adjustable leg assembly for adjusting a height of the frame relative to ground. In another embodiment, the end structure includes a lower track section with a track drive for propelling the frame in the first direction. In another embodiment, the end structure includes a first slew drive. In another embodiments, the first slew drive includes an angle sensor. In another embodiment, the paving machine includes a pivot arm pivotably connecting the end structure to the frame. In another embodiment, the pivot arm is pivotably connected to the frame by a second slew drive. In another embodiment, the paving machine includes a power supply connected to at least the track drive, the first slew drive, and the second slew drive for supplying power to the track drive, the first slew drive, and the second slew drive. In another embodiment, the paving machine includes a processor. In another embodiment, the processor is configured, via executable code, to receive a command to change the angle of the pivot arm relative to the frame. In another embodiment, the processor is configured, via executable code, to determine a steer limit based on a current speed of the paving machine. In another embodiment, the processor is configured, via executable code, to engage the first slew drive in a rotational direction for changing an angle of the lower track section relative to the pivot arm to the steer limit by supplying power from the power supply to the first slew drive. In another embodiment, the processor is configured, via executable code, to receive the angle of the lower track section relative to the pivot arm from the angle sensor. In another embodiment, the processor is configured, via executable code, to determine that a rate-of-change of the angle is below a rate-of-change tolerance such that the first slew drive is not moving by a desired amount. In another embodiment, the processor is configured, via executable code, to engage the first slew drive in a reverse rotational direction for a time. In another embodiment, the processor is configured, via executable code, to reengage the first slew drive in the rotational direction until the angle of the lower track section relative to the pivot arm reaches the steer limit. In another embodiment, the processor is configured, via executable code, to engage the track drive and the second slew drive to change the angle of the pivot arm relative to the frame.

A method is disclosed, in accordance with one or more embodiments of the present disclosure. In one embodiment, the method includes receiving a command to change an angle of a pivot arm relative to a frame. In another embodiment, the method includes determining a steer limit based on a current speed of a paving machine. In another embodiment, the method includes engaging a first slew drive in a rotational direction for changing an angle of a lower track section relative to the pivot arm to the steer limit by supplying power from a power supply to the first slew drive. In another embodiment, the method includes receiving an angle of the lower track section relative to the pivot arm from an angle sensor. In another embodiment, the method includes determining that a rate-of-change of the angle is below a rate-of-change tolerance such that the first slew drive is not moving by a desired amount. In another embodiment, the method includes engaging the first slew drive in a reverse rotational direction for a time. In another embodiment, the method includes reengaging the first slew drive in the rotational direction until the angle of the lower track section relative to the pivot arm reaches the steer limit. In another embodiment, the method includes engaging the track drive and the second slew drive to change the angle of the pivot arm relative to the frame.

Contemplations of the Invention:

A paving machine is disclosed, in accordance with one or more embodiments of the present disclosure. In one embodiment, the paving machine includes a frame including a slip-form for moving in a first direction of travel for forming a material into shape. In another embodiment, the paving machine includes at least one end structure supporting at least a portion of the frame. In another embodiment, the end structure includes a height adjustable leg assembly for adjusting a height of the frame relative to ground. In another embodiment, the end structure includes a lower track section with a track drive for propelling the frame in the first direction. In another embodiment, the paving machine includes a pivot arm pivotably connecting the end structure to the frame. In another embodiment, the pivot arm includes a slew drive. In another embodiment, the slew drive includes an angle sensor. In another embodiment, the paving machine includes a power supply connected to at least the track drive and the first slew drive for supplying power to the track drive and the slew drive. In another embodiment, the paving machine includes a processor. In another embodiment, the processor is configured via executable code to engage the slew drive in a rotational direction for changing an angle of the pivot arm relative to the frame by supplying power from the power supply to the slew drive and the track drive. In another embodiment, the processor is configured via executable code to receive the angle of the pivot arm relative to the frame from the angle sensor. In another embodiment, the processor is configured via executable code to determine that a rate-of-change of the angle is below a rate-of-change tolerance such that the slew drive is not moving. In another embodiment, the processor is configured via executable code to engage the slew drive and the track drive in a reverse rotational direction for a time.

A method is disclosed, in accordance with one or more embodiments of the present disclosure. In one embodiment, the method includes engaging, in a rotational direction, a slew drive and a track drive for changing an angle of a pivot arm to a frame arm by supplying power from a power supply to the first slew drive and the track drive. In another embodiment, the method includes receiving an angle of the pivot arm relative to the frame from an angle sensor. In another embodiment, the method includes determining that a rate-of-change of the angle is below a rate-of-change tolerance such that the slew drive is not moving by a desired amount. In another embodiment, the method includes engaging the slew drive and the track drive in a reverse rotational direction for a time.

A paving machine is disclosed, in accordance with one or more embodiments of the present disclosure. In one embodiment, the paving machine includes a frame including a slip-form for moving in a first direction of travel for forming a material into shape. In another embodiment, the paving machine includes at least one end structure supporting at least a portion of the frame. In another embodiment, the end structure includes a height adjustable leg assembly for adjusting a height of the frame relative to ground. In another embodiment, the end structure includes a lower track section with a track drive for propelling the frame in the first direction. In another embodiment, the paving machine includes a pivot arm pivotably connecting the end structure to the frame. In another embodiment, the pivot arm is pivotably connected to the frame by a slew drive. In another embodiment, the slew drive includes a hydraulic pressure transducer configured to measure a hydraulic pressure of the slew drive. In another embodiment, the paving machine includes a hydraulic power supply connected to at least the track drive and the slew drive, for supplying hydraulic power to the track drive and the slew drive. In another embodiment, the paving machine includes a processor. In another embodiment, the processor is configured, via executable code, to receive a command to change the angle of the pivot arm relative to the frame. In another embodiment, the processor is configured, via executable code, to engage the track drive and the slew drive to change the angle of the pivot arm relative to the frame. In another embodiment, the processor is configured, via executable code, to receive the hydraulic pressure measurements of the slew drive from the hydraulic pressure transducer. In another embodiment, the processor is configured, via executable code, to adjust the hydraulic power supplied to the track drive based on the hydraulic pressure measurements of the slew drive.

A method is disclosed, in accordance with one or more embodiments of the present disclosure. In one embodiment, the method includes receiving a command to change an angle of a pivot arm relative to a frame. In another embodiment, the method includes engaging a track drive and a slew drive to change the angle of the pivot arm relative to the frame. In another embodiment, the method includes receiving hydraulic pressure measurements of the slew drive from a hydraulic pressure transducer. In another embodiment, the method includes adjusting the hydraulic power supplied to the track drive based on the hydraulic pressure measurements of the slew drive.

A paving machine is disclosed, in accordance with one or more embodiments of the present disclosure. In one embodiment, the paving machine includes a frame including a slip-form for moving in a first direction of travel for forming a material into shape. In another embodiment, the paving machines includes at least one end structure supporting at least a portion of the frame. In another embodiment, the end structure includes a height adjustable leg assembly for adjusting a height of the frame relative to ground. In another embodiment, the end structure includes a lower track section with a track drive for propelling the frame in the first direction. In another embodiment, the paving machines includes a pivot arm pivotably connecting the end structure to the frame. In another embodiment, the pivot arm is pivotably connected to the frame by a slew drive. In another embodiment, the slew drive includes a hydraulic pressure transducer configured to measure a hydraulic pressure of the slew drive. In another embodiment, the paving machine includes a hydraulic power supply connected to at least the track drive and the slew drive, for supplying hydraulic power to the track drive and the slew drive. In another embodiment, the paving machine includes a processor. In another embodiment, the processor is configured, via executable code, to receive a command to change the angle of the pivot arm relative to the frame. In another embodiment, the processor is configured, via executable code, to engage the track drive and the slew drive to change the angle of the pivot arm relative to the frame. In another embodiment, the slew drive is periodically engaged with a period of on-times and off-times. In another embodiment, a speed of the track drive is reduced below a current speed of the paving machine.

A method of dithering a pivot arm of a paving machine is disclosed, in accordance with one or more embodiments of the present disclosure. In one embodiment, the method includes receiving a command to change an angle of a pivot arm relative to a frame. In another embodiment, the method includes engaging a track drive and a slew drive to change the angle of the pivot arm relative to the frame. In another embodiment, the slew drive is periodically engaged with a period of on-times and off-times. In another embodiment, a speed of the track drive is reduced below a current speed of the paving machine.

BRIEF DESCRIPTION OF THE DRAWINGS

Implementations of the concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
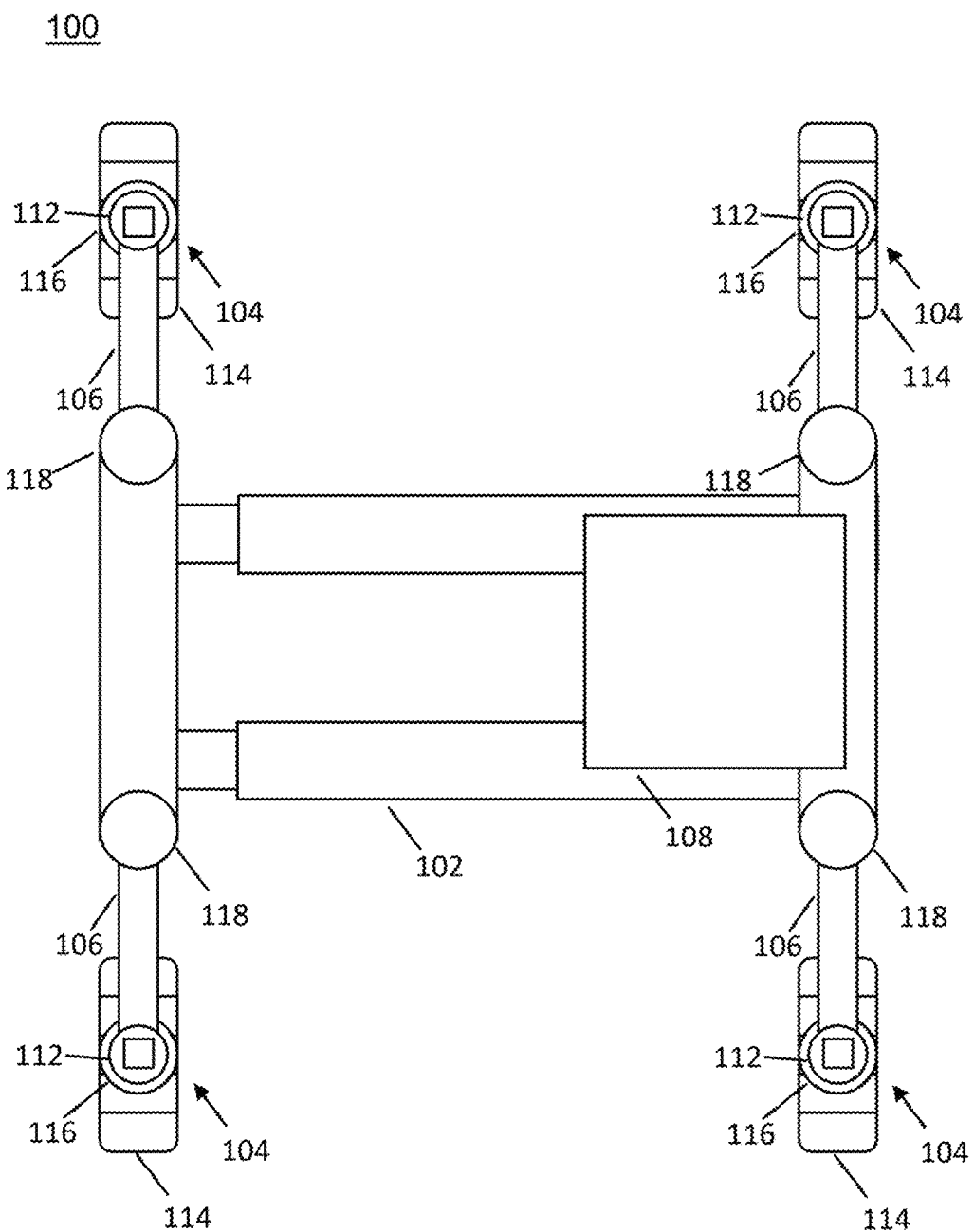
FIG. 1A depicts a simplified top view of a paving machine, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment", "in embodiments", or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Referring generally to FIGS. 1A-4, a paving machine 100, a slew drive 200, a method 300, and a method 500 is disclosed, in accordance with one or more embodiments of the present disclosure.

Figure 1B:
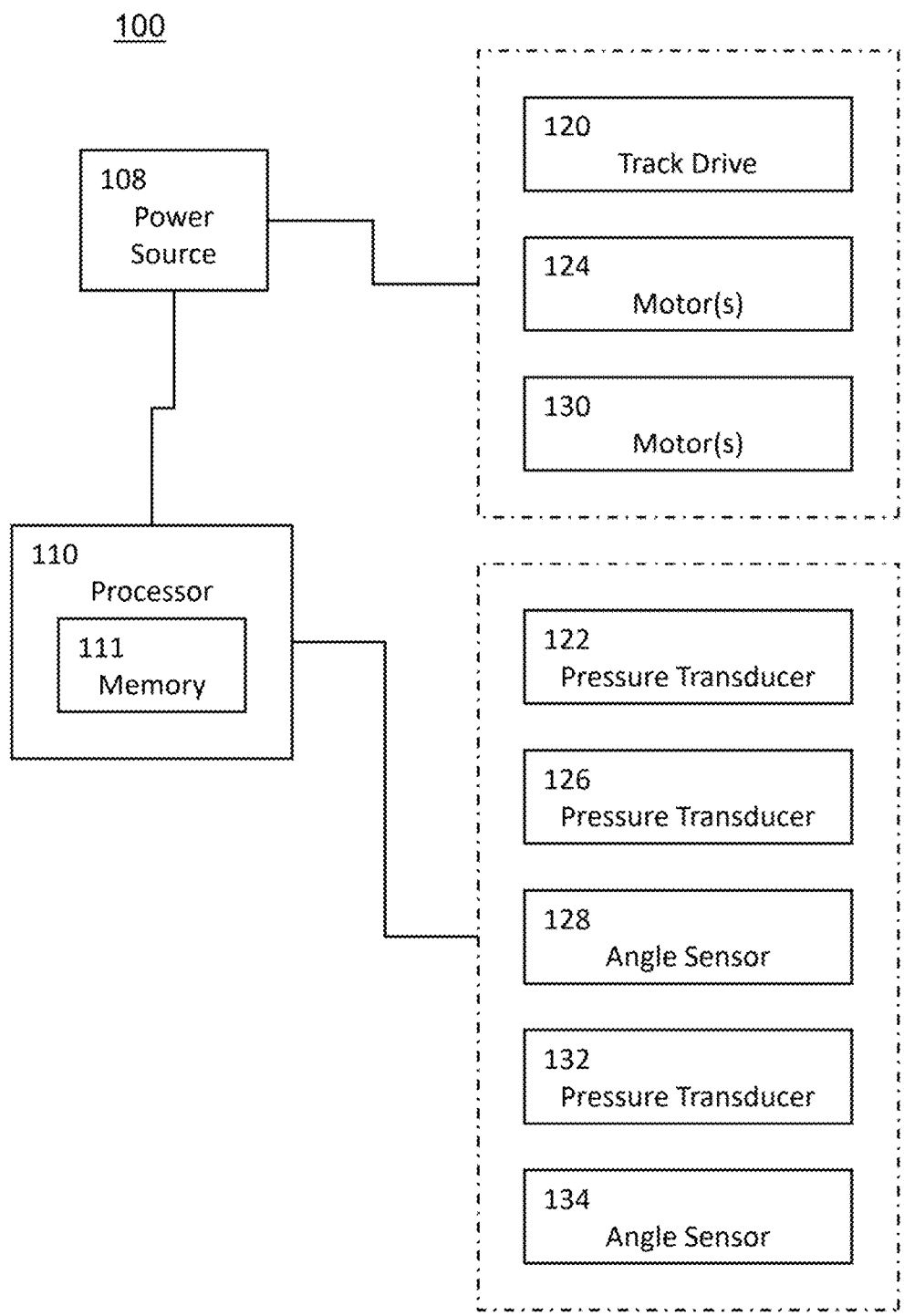
FIG. 1B depicts a schematic diagram of a control system of the paving machine, in accordance with one or more embodiments of the present disclosure.

Referring now to FIGS. 1A-1B, the paving machine 100 is described, in accordance with one or more embodiments of the present disclosure. The paving machine 100, may include any suitable paving machine, such as, but not limited to, a slipform paver. The paving machine 100 may include one or more of frame 102, end structures 104, pivot arms 106, power source 108, and processor 110. The frame 102 may include a slip-form (not depicted). The slip-form may be moved in a first direction of travel for forming a material into shape. For example, the material may include concrete to be formed into a roadway. The slip-form may be mountable below the frame. In some embodiments, the frame 102 may include an adjustable width, although this is not intended to be limiting. The power source 108 may be connected to the frame 102. The power source 108 may include any power source configured to generate power known in the art, such as, but not limited to, a gasoline engine, a diesel engine, or an electric power sources of various sizes and power ratings. The power source 108 may be then configured to supply the power to one or more components of the paving machine 100. For example, the power source 108 may generate hydraulic power or electric power for supplying to one or more components. The power source 108 may be configured to one or more of stop, slow, or reverse a first drive or stop, slow, or reverse one or more other drives to mitigate an under or over drive of the first drive.

The paving machine 100 may further include one or more end structures 104. For example, the paving machine 100 may include two, three, or four end structures 104. The end structures 104 may support at least a portion of the frame 102. In this regard, the end structures 104 may be configured to support from 10,000 pounds to 27,000 pounds, or more. The end structure 104 may include a height adjustable leg assembly 112. The leg assembly 112 may be configured to adjust a height of the frame 102 relative to a ground surface. In this regard, the leg assembly 112 may include an outer tube portion and an inner tube portion coupled by a linear actuator, such that the outer tube portion and the inner tube portion may be configured to telescope relative to one another.

The end structure 104 may include a lower track section 114. The lower track section 114 may be disposed below the leg assembly 112. Power may be supplied from the power source 108 to the lower track section 114 (e.g., to a track drive 120 of the lower track section). In response to receiving the power, the track drive 120 may turn an endless track of the lower track section 114. By turning the endless track, the paving machine 100 may be propelled in the paving direction. The track drive 120 may also be used to assist in pivoting the pivot arm 106 (i.e., pivoting on-the-go, stationary pivoting).

The end structure 104 may include a slew drive 116. The slew drive 116 may be configured to adjust an angle of the lower track section 114 relative to the pivot arm 106. Power may be supplied from the power source 108 to the slew drive 116. In response to receiving the power, the slew drive 116 may adjust the angle of the lower track section 114 relative to the pivot arm 106. In this regard, the slew drive 116 may be considered to control a steering angle of the lower track section 114. For example, the slew drive 116 may include one or more motors 124 (e.g., two motors). The motor(s) 124 may receive the power from the power source 108 and rotate one or more components of the slew drive 116 for adjusting the angle of the lower track section 114 relative to the pivot arm 106. The slew drive 116 may be coupled in a variety of configurations for adjusting the angle. For example, the slew drive 116 may be coupled between the inner tube portion of the leg assembly 104 and the lower track section 114, as described in U.S. Pat. No. 9,764,762, titled "ROTARY PIVOT ARM POSITIONING ASSEMBLY". By way of another example, the slew drive 116 may be coupled between the outer tube and the inner tube, as described in U.S. patent application Ser. No. 17/336,863, titled "LEG ASSEMBLY FOR CONSTRUCTION MACHINE".

The paving machine 100 may include one or more pivot arms 106. The pivot arm 106 may pivotably connect the end structure 104 with the frame 102. In this regard, each pivot arm 106 may include an associated end structure 104. In some embodiments, the pivot arms 106 are pivotably connected to the frame by a slew drive 118, although this is not intended as a limitation on the present disclosure (e.g., the pivot arms 106 may be pivotably connected to the frame by a slew drive, a ratcheting assembly, a four-bar-linkage configuration of a hydraulic cylinder, a planetary drive, etc.). The slew drive 118 may be configured to adjust an angle of the pivot arm 106 relative to the frame 102. Power may be supplied from the power source 108 to the slew drive 118. In response to receiving the power, the slew drive 118 may adjust the angle of the pivot arm 106 relative to the frame 102. For example, the slew drive 118 may include one or more motors 130 (e.g., two motors). The motor(s) 130 may receive the power from the power source 108 and rotate one or more components of the slew drive 118 for adjusting the angle of the pivot arm 106 relative to the frame 102.

One or more of the slew drive 116 or the slew drive 118 may be similar to the slew drive 200 described in reference to FIGS. 2A-2D, although this is not intended as a limitation on the present disclosure.

In some instances, one or more of the slew drive 116 or the slew drive 118 may lock-up or seize. While one or more of the slew drive 116 or the slew drive 118 are seized, one or more of the slew drives 116, 118 may include a reduced rotation in a desired direction (e.g., clockwise or counter-clockwise rotation). Due to the seizure, a position error in the associated component (i.e., the lower track section 114 or the pivot arm 106) may accumulate. One or more of the slew drive 116, the slew drive 118, or the track drive 120 of one more pivot arms may be selectively controlled to prevent seizure of the slew drive 116 or the slew drive 118 of said pivot arm or another pivot arm of the paving machine 100. To address seizure of the slew drive 116 or slew drive 118, a control diagram for the paving machine 100 is provided herein. Preventing the slew drive 116 and the slew drive 118 from seizing may be advantageous in improving an operational life-time of the construction machine 100 or its components. In this regard, components of the slew drive 116 or the slew drive 118 (e.g., a drive gear or a ring gear) may experience scuffing or spalling should the slew drive 116 continue to be driven while seized.

Referring now to FIG. 1B, a simplified control diagram of the paving machine 100 is described, in accordance with one or more embodiments of the present disclosure. The paving machine 100 may further include a processor 110 and a memory 111. The processor 110 may be communicatively coupled with one or more components of the paving machine 100. For example, the processor 110 may be communicatively coupled with one or more of the power source 108, the memory 111, or a batch of sensors. The processor 110 may be configured to execute a set of program instructions maintained on the memory 111. The set of program instructions may be configured to cause the processor 110 to carry out the steps of the present disclosure. The processor 110 may selectively provide power from the power source 108 to one or more of stop, slow, or reverse a first drive or stop, slow, or reverse one or more other drives to mitigate an under or over drive of the first drive. The processor 110 may engage one or more of the lower track section 114 (i.e., track drive 120), the slew drive 116 (i.e., motor(s) 124), or the slew drive 118 (i.e., motor(s) 130). The processor 110 may engage the slew drive 116 by providing power from the power source 108 to the motors 124. Similarly, the processor 110 may engage the slew drive 118 by providing power from the power source 108 to the motors 130. Similarly, the processor 110 may engage the track drive 120 by providing power from the power source 108 to the track drive 120. Furthermore, the processor 110 may be configured to control an amount of power provided to the component. In this regard, the processor 110 may be configured to control a hydraulic power supplied by one or more hydraulic valves or control an electrical power supplied by a switching circuit. Such hydraulic valves may include any hydraulic valve, such as, but not limited to, an Eaton CMA valve or a D03 valve.

In embodiments, the slew drive 116 may be used to rotate the lower track section 114 relative to the pivot arm 106. In this regard, a command may be received to change the angle of the lower track section 114. The lower track section 114 may be adjusted to the desired angle by the slew drive 116.

In embodiments, one or more of the slew drive 118 or the track drive 120 may be used to rotate the pivot arm 106 relative to the frame 102. In this regard, a command may be received to change the angle of the pivot 106 (e.g., pave-to-transport, transport-to-pave, on-the-go paving width change, etc.). The processor 110 may determine an appropriate angle of the lower track section 114. The lower track section 114 may be adjusted to the desired angle by the slew drive 116. Where the lower track section 114 is at the appropriate angle, the track drive 120 and the slew drive 118 may be engaged, with the track drive 120 reducing a torque requirement of the slew drive 118. The helper angle may be determined based on a steering limit of the paving machine 100. For instance, where the angle of the pivot arm 106 is being changed on-the-go, the steering limit may be based on a speed of the paving machine 100 such that lower track section 114 does not skip over the ground during travel. By way of another instance, where the angle of the pivot arm 106 is being changed while the paving machine 100 is stationary, the steering limit may be set to a maximum amount (e.g., ninety degrees, or more). Upon determining the angle of the lower track section 114, the slew drive 118 may be engaged to rotate the lower track section 114 to the desired angle. The slew drive 118 and the track drive 120 may then be engaged for pivoting the pivot arm 106 to the desired angle. In some embodiments, the slew drive 118 is periodically engaged. In this regard, where the pivot arm 106 is trailing a current direction of travel, tangential forces from the lower track section 114 may be reduced.

The processor 110 may monitor the drives to anticipate a need for a change in rate or direction of a single drive or a set of drives in a programmed choreographed position, configuration, or steering change. In this regard, the processor 110 may receive various information from the sensors and control the drives for executing a desired operation, such as, but not limited to, the steps in a method 300 or a method 500. The processor 110 may selectively engage one or more of the slew drive 116, the slew drive 118, or the track drive 120 based on one or more measurements from one or more of the pressure transducer 122, the pressure transducer 126, the angle sensor 128, the pressure transducer 132, or the angle sensor 134. For example, the processor 110 may determine one or more of the slew drive 116 or the slew drive 118 is seized based on measurements from one or more of the pressure transducer 122, the pressure transducer 126, the angle sensor 128, the pressure transducer 132, or the angle sensor 134.

In some embodiments, the processor 110 is configured to receive the various measurements from one or more of sensors indicating the angular rotation the one or more of the lower track section 114 relative to the pivot arm 106 or the angular rotation of the pivot arm 106 relative to the frame 102. For example, the processor may receive measurements from an angle sensor 128 or an angle sensor 134. The slew drive 116 may include the angle sensor 128 for determining relative rotational movements. By the angle sensor, the angle of the lower track section 114 relative to the pivot arm 106 may be determined. For example, the relative rotational movements of the slew drive 116 between a first angle and a second angle may correspond to a similar rotational movement of the lower track section 114 between the first angle and the second angle. Similarly, the slew drive 118 may include the angle sensor 134 for determining relative rotational movements of the slew drive 118. By the angle sensor 134, the angle of the pivot arm 106 relative to the frame 102 may be determined. For example, the relative rotational movements of the slew drive 118 between a third angle and a fourth angle may correspond to a similar rotational movement of the pivot arm 106 between the third angle and the fourth angle. The measurements from the angle sensor 128 and the angle sensor 134 may be implemented in one or more methods, as described further herein. In some embodiments, one or more of the angle sensor 128 or the angle sensor 134 may be similar to the angle sensor 220, although this is not intended to be limiting. The angle sensors 128, 134 may include any angle sensor known in the art, such as, but not limited to, a rotary encoder, a tachometer, a quadrature sensor, or an absolute encoder.

In some embodiments, the processor 110 is configured to selectively engage one or more of the slew drive 116, the slew drive 118, or the track drive 120 based on the various measurements from one or more of sensors indicating the angular rotation the one or more of the lower track section 114 relative to the pivot arm 106 or the angular rotation of the pivot arm 106 relative to the frame 102. For example, the processor 110 may receive the angular position information from the angle sensor 128 and determine a position error of the lower track section 114 (e.g., based on a desired rotation and a measured rotation). Such information may indicate the slew drive 116 is seized. The processor 110 may then execute the steps of the method 300 for unseizing the slew drive 116. When the slew drive 116 is seized, the processor 110 may detect when there is a drive to the motor 124 but the angular positions measured by the angle sensor 128 is below an expected rate-of-change. When this happens, the motor 124 may be engaged in the opposite direction to "unlock" the slew drive 116. Once this correction takes place the software may work as normal until another event of a stuck slew drive takes place. By way of another example, the processor 110 may receive the angular position information from the angle sensor 134 and determine a position error of the pivot arm 108 (e.g., based on a desired rotation and a measured rotation). Such information may indicate the slew drive 118 is seized. The processor 110 may then execute the steps of the method 300 for unseizing the slew drive 118. When the slew drive 118 is seized, the processor 110 may detect when there is a drive to the motor 130 but the angular positions measured by the angle sensor 134 is below an expected rate-of-change. Although the processor 110 is described as unseizing one or more of the slew drive 116 or the slew drive 118 based upon an angular-rate-of-change, this is not intended as a limitation on the present disclosure.

In this regard, the processor 110 may determine a seizure event based upon one or more hydraulic pressure readings.

In some embodiments, the processor 110 is configured to receive the various measurements from one or more of sensors indicating the load of the one or more of the drives. For example, the slew drive 116 may include a pressure transducer 126. The pressure transducer 126 may measure the hydraulic pressure of the hydraulic fluid supplied to the slew drive 116. The slew drive 116 may encounter a load (i.e., for steering the lower track section 114). By way of another example, the slew drive 118 may include a pressure transducer 132. The pressure transducer 132 may measure the hydraulic pressure of the hydraulic fluid supplied to the slew drive 118. The slew drive 118 may encounter a load (i.e., for pivoting the pivot arm 106). By way of another example, the track drive 120 may include a pressure transducer 122. The pressure transducer 122 may measure the hydraulic pressure of the hydraulic fluid supplied to the track drive 120. The track drive 120 may encounter a load (i.e., to propel the endless track). Thus, the processor may receive measurements from the pressure transducer 122, the pressure transducer 126, or the pressure transducer 132. Such pressure transducers 122, 126, 132 may include any pressure transducers known in the art, such as, but not limited to, potentiometric pressure sensors, inductive pressure sensors, capacitive pressure sensors, piezoelectric pressure sensors, variable reluctance pressure sensors.

In some embodiments, the processor 110 is configured to selectively engage one or more of the slew drive 116, the slew drive 118, or the track drive 120 based on the various measurements from one or more of sensors indicating the hydraulic pressures. Such hydraulic pressure measurements from one or more of the pressure transducers 122, 126, 132 may be implemented in one or more of the methods, as described further herein. For example, the processor 110 may receive hydraulic pressure measurements associated with the slew drive 118 from the pressure transducer 132. The hydraulic pressure measurements may indicate whether the slew drive 118 is likely to experience a seizure event. In this regard, the slew drive 118 may include a range of hydraulic pressures which is suitable for providing sufficient torque for turning the pivot arm 106 while remaining unseized. To ensure the slew drive 118 hydraulic pressure remains near the desired pressure levels, the processor 110 may control the power supplied to one or more components of the paving machine 100 based on the pressure measurements of the slew drive 118. The processor 110 may control power supplied to one or more of the slew drive 116, the slew drive 118, or the track drive 120. In one embodiment, a speed of the track drive 120 may be controlled to assist the slew drive 118. By way of another example, the processor 110 may receive hydraulic pressures measurements associated with the track drive 120 from the pressure transducer 122. Where the hydraulic pressure of the track drive exceeds a maximum track drive pressure, the processor 110 may be configured to remove hydraulic pressure to one or more of the slew drive 116, the slew drive 118, or the track drive 120. In this regard, when the hydraulic pressure of the track drive 120 exceeds the tolerance, a failure event is likely to occur. By preventing the track drive 120 from overdriving the slew drive 118, component failure may be reduced. Furthermore, a speed of the slew drive 118 and the track drive 120 may be jointly controlled, for reducing a likelihood of the slew drive 118 becoming seized.

Although one or more of the track drive 120, the motor 124, or the motor 130 is described as being powered by a hydraulic power, this is not intended as a limitation on the present disclosure. In this regard, one or more of the track drive 120, the motor 124, or the motor 130 may be powered by any power source, such as, but not limited to, an electric power source or a hydraulic power source. Similarly, one or more of the track drive 120, the motor 124, or the motor 130 may include any suitable sensor for measuring the electric power supplies, such as, but not limited to, current sensors, resistance sensors, or voltage sensors. Such sensors may be configured to sense the load of one or more of the slew drive 116, the slew drive 118, or the track drive 120.

In embodiments, fault events may be stored in the memory 111. Thus, a log may be automatically generated indicating a number of times the slew drive 116 or the slew drive 118 is seized. Depending upon the number of times, a notification may be provided to an operator that there is an error to be corrected (e.g., if the number exceeds a fault tolerance). For example, upon receiving a notification of the fault events an operator may add additional grease to the slew drive 116 or the slew drive 118, by one or more grease fittings (e.g., zerks).

As may be understood, the processor 110 may include any one or more processing elements known in the art. In this sense, the processor 110 may include any microprocessor-type device configured to execute software algorithms and/or instructions. For example, the processor 110 may consist of a mobile machine control computer, a desktop computer, mainframe computer system, workstation, parallel processor, or other computer system configured to execute a program configured to operate the paving machine 100, as described throughout the present disclosure. Similarly, the memory 111 may include any storage medium known in the art suitable for storing program instructions executable by the processor 110. For example, the memory 111 may include a non-transitory memory medium such as, but not limited to, a read-only memory (ROM), a random-access memory (RAM), a solid-state drive, and the like. It is further noted that memory 111 may be housed in a common controller housing with the processor 110. The processor 110 may be configured to receive the various information from the sensors by one or more controller area network buses.

Figure 2A:
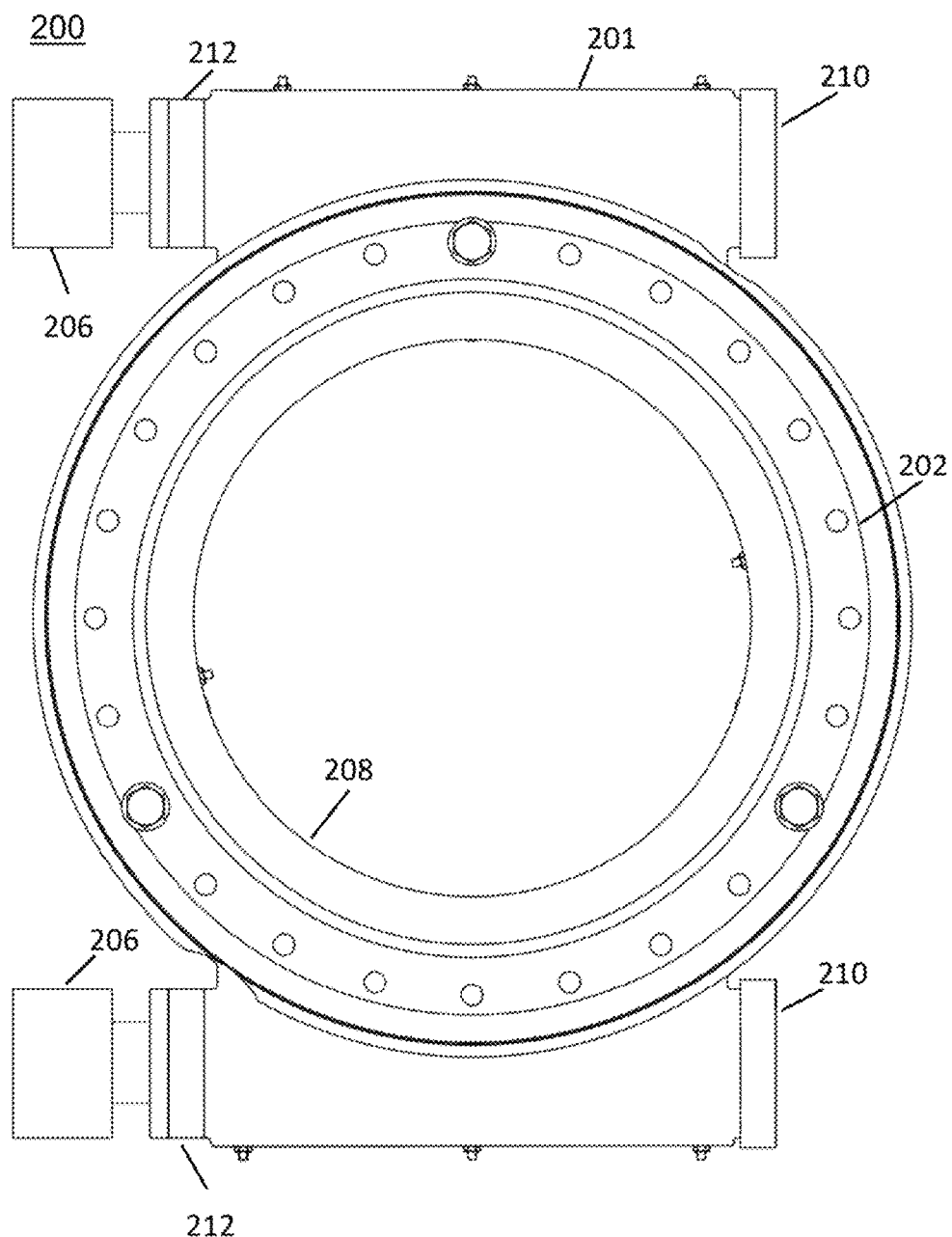
FIG. 2A depicts a top view of a slew drive, in accordance with one or more embodiments of the present disclosure.
Figure 2B:
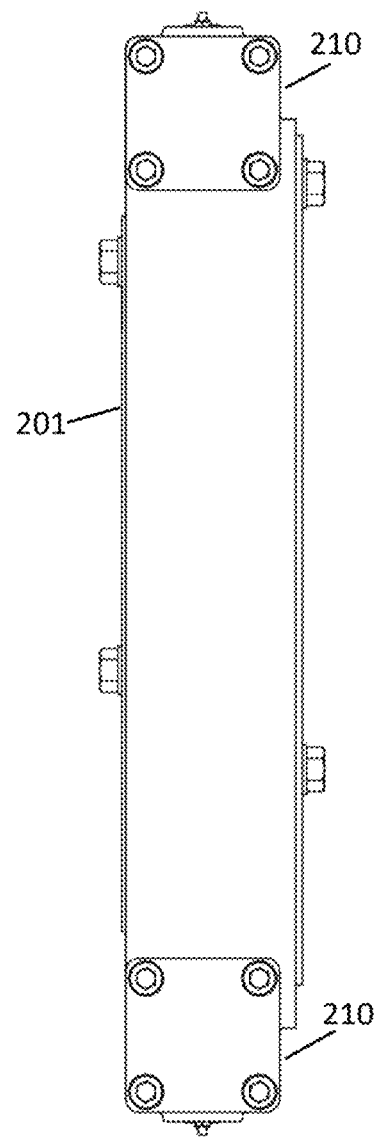
FIG. 2B depicts a right-side view of the slew drive, in accordance with one or more embodiments of the present disclosure.
Figure 2C:
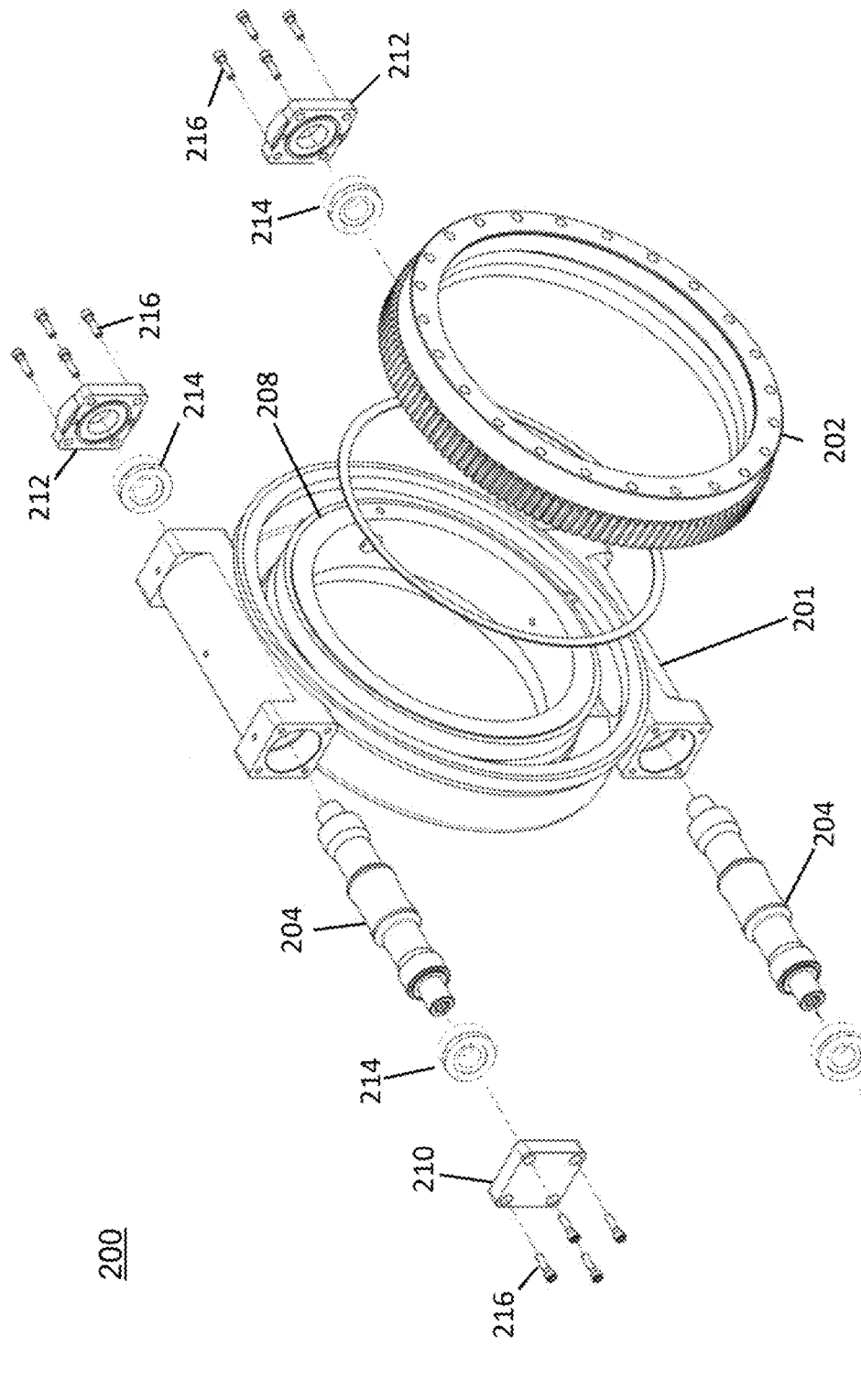
FIGS. 2C-2D depicts an exploded view of the slew drive, in accordance with one or more embodiments of the present disclosure.
Figure 2D:
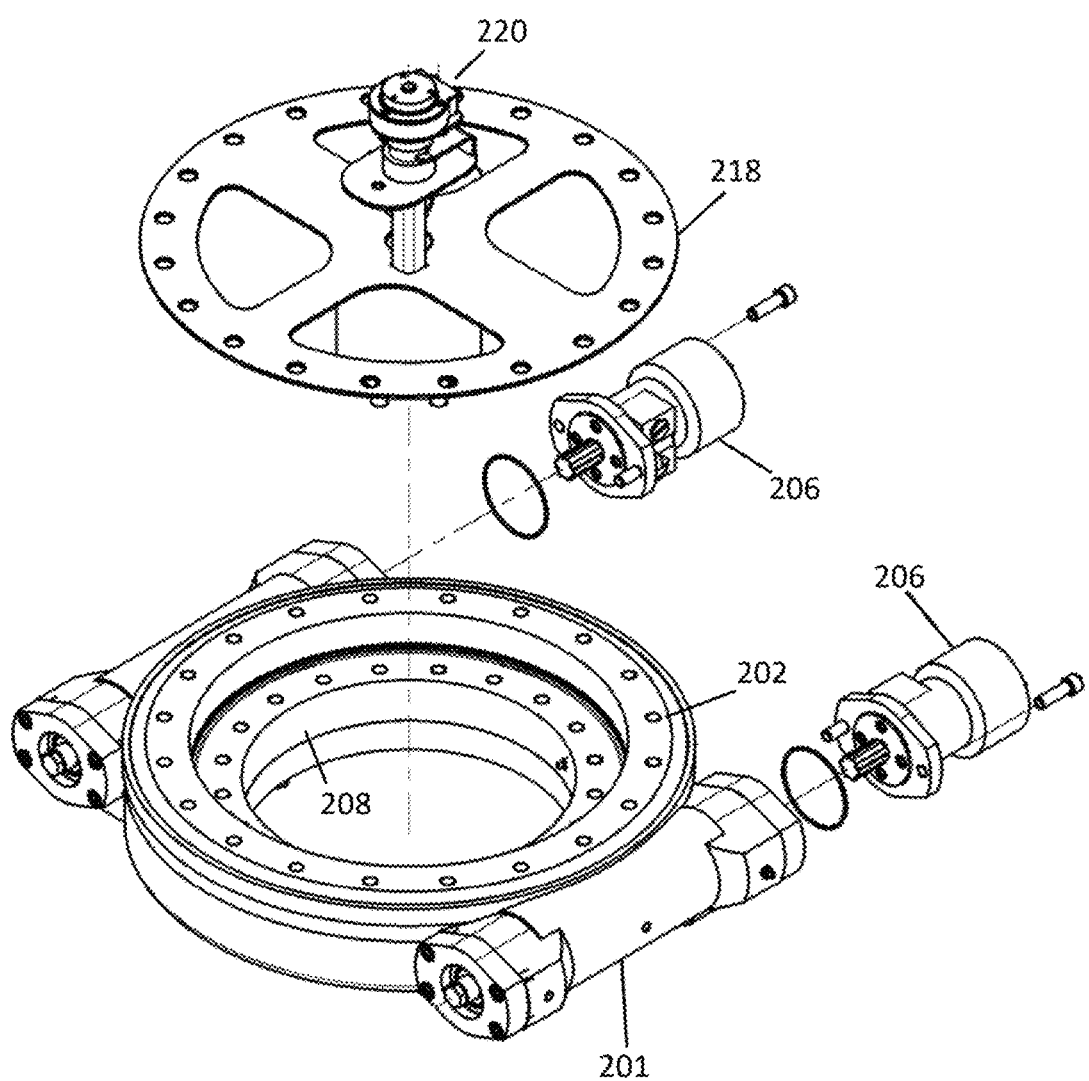

Referring now to FIGS. 2A-2C, a slew drive 200 is disclosed, in accordance with one or more embodiments of the present disclosure. The slew drive 200 may be configured to generate an output torque for rotating various components of the paving machine 100, such as, but not limited to, providing rotation of a pivot arm or providing rotation of a lower track section 114. The slew drive 200 may include, but is not limited to, a ring gear 202, a drive gear 204, and a motor 206 for the drive gear 204. In some embodiments, the slew drive 200 includes two drive gears 204 and two motors 206, although this is not intended to be limiting. The ring gear 202 and the drive gear 204 may be housed within one or more portions of the housing 201. When housed within the housing 201, the drive gear 204 may be configured to drive the ring gear 202. In this regard, the drive gear 204 and the ring gear 202 may each include a gear tooth profile by which the ring gear 202 and the drive gear 204 may mesh. The drive gear 204 may include any suitable drive gear, such as, but not limited to, a cylindrical gear or an hourglass gear. The ring gear 202 may similarly include a suitable design for mating with the drive gear 204. Depending upon a pressure angle of the ring gear 202 and a pressure angle of the drive gear 204, the ring gear 202 may provide a holding torque when power is removed from the drive gear 204. For example, the ring gear 202 and the drive gear 204 may include a pressure angle, such as, but not limited to, 6 degrees, 7 degrees, 14.5 degrees, or twenty degrees, or an angle contained therein. Advantageously, the slew drive 200 may lock the rotational position by the holding torque without a continuous power supply.

The motor 206 may drive the drive gear 204, with the drive gear 204 then driving the ring gear 202. The motor 206 may include any suitable motor for driving the drive gear 204, such as, but not limited to, a hydraulic motor or an electric motor. In embodiments, the slew drive 200 may include multiple drive gears 204. Similarly, the slew drive 200 may include multiple motors 206. For example, the slew drive 200 may include a first drive gear 204 driven by a first motor 206 and a second drive gear 204 driven by a second motor 206 (e.g., a double-drive assembly). Where the slew drive 200 includes a two or more motors 206, the associated drive gears 204 may each engage the ring gear 202.

In embodiments, the housing 201 may include an inner race 208 disposed within, and configured to rotate relative to, the ring gear 202. A paving machine may include one or more components which is configured to couple with the inner race 208 and one or more additional components configured to couple with the ring gear 202. In this regard, the components which are coupled with the inner race 208 may rotate relative to the components coupled with the ring gear 202. For example, a lower track section and a leg assembly may be coupled by the slew drive 200, such that the slew drive 200 may rotate the lower track section relative to the leg assembly. By way of another example, a machine frame and a swing arm may be coupled by the slew drive 200, such that the slew drive 200 may rotate the swing arm relative to the frame. By way of another example, an upper tube and a lower tube of the leg assembly may be coupled by the slew drive 200, such that the upper tube may rotate relative to the lower tube.

In some embodiments, the slew drive 200 includes one or more bearings. For example, each end of the drive gear 204 may include a bearing. The bearing may interface between the drive gear 204 and the housing 201. The one or more bearings may include a tapered roller bearing including an inner race and an outer race. Depending upon an axial load, the bearing may be prone to failure. For example, when the drive gear 204 is engaged, the bearings may experience tens of thousands of pounds of force. Upon failing, the bearing may allow the drive gear 204 to translate axially, thereby increasing loads on various components, such as, but not limited to, the end plates 210, motor mount 212, and fasteners 216. Additionally, the failure may cause a reduced accuracy of the positioning.

In some embodiments, the slew drive 200 includes one or more bushings 214. Such bushing 214 may be configured to withstand large radial or axial forces generated by the drive gear 204 engaging the ring gear 202. The bushing 214 may be a sleeve type bushing with no ball bearings. In this regard, the bushing 214 may be configured to withstand the axial load and the radial load. In embodiments, the bushing 214 may include a high strength material, such as an aluminized-bronze material. For example, the aluminized-bronze material may be a C954 alloy per American Society for Testing and Materials (ASTM) B505 specification with a chemical composition by weight of between 10 to 11.5 percent aluminum, at least 83 percent copper, between 3 to 5 percent iron, 0.5 percent manganese, and 1.5 percent nickel. The bushing 214 may include an inner diameter, by which the bushing 214 is configured to receive a shaft of the drive gear 204. For example, a fit between the inner diameter and the shaft may be a clearance fit. In this regard, as the drive gear 204 is rotated, the shaft of the drive gear 204 may be rotated relative to the bushing 214. The bushing 214 may similarly include an outer diameter, by which the bushing 214 may be inserted into the housing 201 (e.g., by a press fit). In this regard, the drive gear 204 may be inserted into the drive portion of the housing 201; the bushing 214 may be press fit into the housing 201, such that a shaft of the drive gear 204 may be aligned and supported by the bushing 214. One or more end plates 210 and motor adapters 212 may then be attached to the housing 201, to retain the drive gear 204 and the bushing 214. By the bushing 214, the drive gear 204 may be configured to rotated about an axis coincident with an axis of the end plates 210 and motor adapters 212. Similarly, the bushing 214 may transfer any loads (e.g., axial or radial loads) from the drive gear 204 into one or more of the end plates 210, the motor adapter 212, or the housing 201. For example, a portion of the axial load (e.g., a thrust) transferred from the drive gear 204 may correspond to an amount of force by which the drive gear 204 engages the ring gear 202, with at least a portion of such axial load being transferred to the end plate 210 or the motor adapter 212. A minimum required output torque of the slew drive 200, and similarly the axial load by the drive gear 204, may be at least partially dependent upon a weight of a paving machine. By way of another example, a portion of the radial load transferred from the drive gear 204 may correspond to a portion of weight of the paving machine, with at least a portion of such radial load being transferred to the housing 201. Although the bushing 214 has been described as being press fit into the housing 201, this is not intended as a limitation on the present disclosure. In this regard, the bushing 214 may be press fit over the shaft of the drive gear 204 together with a clearance fit to the housing 201.

In some instances, the slew drive 200 may lock-up or seize. While seized, the slew drive may include a reduced rotation in a desired direction. For example, the contact angle of the drive gear 204 may allow the drive gear 204 to overdrive the ring gear 202. Upon overdriving the ring gear 202, the slew drive 200 may lock-up, such that the ring gear 202 may not be driven in the current rotary direction without correction. By way of another example, the slew drive 200 may include two drive gears such that a first drive gear may underdrive the ring gear 202 and a second drive gear may overdrive the ring gear 202. By way of another example, the bushing 214 may include a higher rolling coefficient of friction than the roller bearing, such that the slew drive may lock-up more frequently.

In embodiments, the slew drive 200 includes one or more sensors for determining the slew drive 200 is seized.

For example, the slew drive 200 may include an angle sensor 220. The angle sensor 220 may determine the rotational angle of the slew drive 200. As may be understood, the angle sensor 220 may include any suitable angle sensor, such as, but not limited to, a rotary encoder, an absolute encoder, an incremental encoder, a mechanical encoder, a magnetic encoder, an optical encoder. The angle sensor 220 may provide the rotation information to a controller of a paving machine (i.e., the processor 110 of the paving machine 100). Such information may then be stored in a memory, for determining if the slew drive 200 is seized. In some embodiments, the slew drive 200 may be determined to be seized based on an angular-rate-of-change of measurements from the angle sensor 220. The slew drive 200 may then be driven in a reverse rotational direction, in accordance with one or more embodiments of the present disclosure. The angle sensor 220 may be a component of the rotary sensor assembly 218. The rotary sensor assembly 218 may be configured to couple with the inner race 208 and couple with the ring gear 202. In this regard, the rotary sensor assembly 218 may include one or more components which are configured to rotate with the inner race 208 and one or more components which are configured to separately rotate with the ring gear 202. The angle sensor 220 may then determine the rotation of the inner race 208 relative to the ring gear 202.

By way of another example, the slew drive 200 may include one or more pressure transducers. The pressure transducer may measure the hydraulic pressure of the motor 206. The pressure transducer may determine the hydraulic pressure with a frequency. For example, the pressure transducer may include a measurement frequency from 10 Hz to 20 Hz (i.e., a period of 100 from 50 milliseconds). The pressure may be used to selectively control the motor 206. Upon locking-up, a pressure reading may spike to a value above a maximum normal operating pressure. For example, the maximum normal operating pressure may include, but is not limited to, from 1750 psi to 2500 psi. If the pressure is not reduced below the maximum normal operating pressure, an auditory popping noise may be heard together with a potential for various component failure. Therefore, it may be desirable to provide for automatic control for pressure correction to reduce slew drive lock-up. In this regard, the motor 206 may be controlled based on the pressure reading of the pressure transducer.

Although the motor 206 is described as being controlled based on one or more of the angle measurements of the angle sensor or the pressure reading of the pressure transducer, this is not intended as a limitation.

For example, the motor 206 may be controlled based on measurement from the current sensors, resistance sensors, or voltage sensors indicating the slew drive 200 is seized. The current sensors, resistance sensors, or voltage sensors may indicate a load on the motor 206, where the motor is powered by an electrical power.

By way of another example, the slew drive 200 may include a sensor between the drive gear 204 and one or more of the end plate 210 or the motor mount 212. The sensor may determine a position of the drive gear 204. The position of the drive gear 204 may then be compared with an expected position to determine if the drive gear 204 is over-driving or under-driving the ring gear 202. The sensor may include an accuracy, such as, but not limited to, between one thousandth and 5 thousandths of an inch (between 0.0254 mm and 0.127 mm). In some embodiments, the sensor may include a strain gauge for determining a deflection of one or more of the end plate 210 or the motor mount 212. Readings from such strain gauge(s) may be used to determine the deflection, based, at least in part, on various material properties of the slew drive (e.g., a modulus of elasticity of the end plate 210, a modulus of elasticity of the motor mount 212, a modulus of elasticity of the drive gear 204, etc.). In some embodiments, deflection of both the end plate 210 and the motor mount 212 is determined. Such strain gauge pairs may determine a difference in deflections between the end plate 210 and the motor mount 212. The difference in deflection may indicate whether the slew drive 200 is seized due to a flexure of the housing 201 caused by the drive gear 204. The ability to determine the position of the drive gear 204 may be particularly advantageous where the slew drive 200 includes a dual-drive configuration. In this regard, a first sensor may determine a position of the first drive gear 204 and a second sensor may determine a position of the second drive gear 204. The positions of the first and second drive gears 204 may be compared to determine whether either of the drive gears 204 is out-of-time. When one or more of the drive gears 204 is out-of-time in a double-drive configuration, the slew drive 200 may lock-up more frequently. In some embodiments, the positions of the first and second drive gears 204 is provided to the controller, such that the controller may control the first and second motors 206. In this regard, the first and second motors 206 may be controlled by a control loop based on the position measurements of the first and second drive gears 204.

In embodiments, the slew drive 200 includes one or more fasteners 216. By the fasteners 216, the end plate 210 and the motor adapter 212 may be coupled with the drive gear portion of the housing 201. Similarly, the fasteners 216 may fasten the motor 206 with the motor adapter 212. The fasteners 216 may experience stress due to the axial loading of the drive gear 204. In some embodiments, the fasteners 216 are selected with properties to resist failure due the axial loading. For example, the fasteners 216 may include, but are not limited to, an M16 or greater sized bolt. By way of another example, the fasteners may include but are not limited to an alloy steel material, such as, but not limited to a Class 12.9 bolt per ISO 898-1, ANSI B1.13M, ISO 261, and ISO 262.

When the fasteners 216 are secured to the end plate 210 or the motor adapter 212, the fastener 216 may be preloaded in tension. In some embodiments, a material of the end plate 210 or the motor adapter 212 is selected to reduce wear from the fasteners 216. By selecting the material, the bolt may remain preloaded for a longer duration before becoming loose or failing. For example, the end plate 210 or the motor adapter 212 may include, but are not limited to, a low-carbon steel (e.g., a cold-finished 1018 steel).

As may be understood, a size of the slew drive 200 may be selected based upon a torque requirement of a desired application. In some embodiments, the slew drive 200 is used to control various components of a paving machine. In this regard, the desired output torque may be based on a weight of the paving machine which the leg assembly 100 supports. For example, the paving machine may include a four-track slipform paver or a three-track curb-and gutter machine. The four-track slipform pavers may include a paving width between a range of widths, such as, but not limited to, between twelve feet and fifty feet, or greater (e.g., between twelve to forty feet, between twelve and thirty feet, between twelve and twenty-four feet, etc.). Such four-track slipform pavers may require a larger output torque than the three-track curb-and-gutter machine. In this regard, it is contemplated that the slew drive 200 may include a diameter from fourteen inches to twenty-one inches, depending upon the desired output torque. Although the paving machine has been described by an application of a four-track slipform paver or a three-track curb-and-gutter this is not intended as a limitation of the present disclosure. Furthermore, it is contemplated that the slew drive 200 may be used in applications outside of paving machines.

Figure 3:
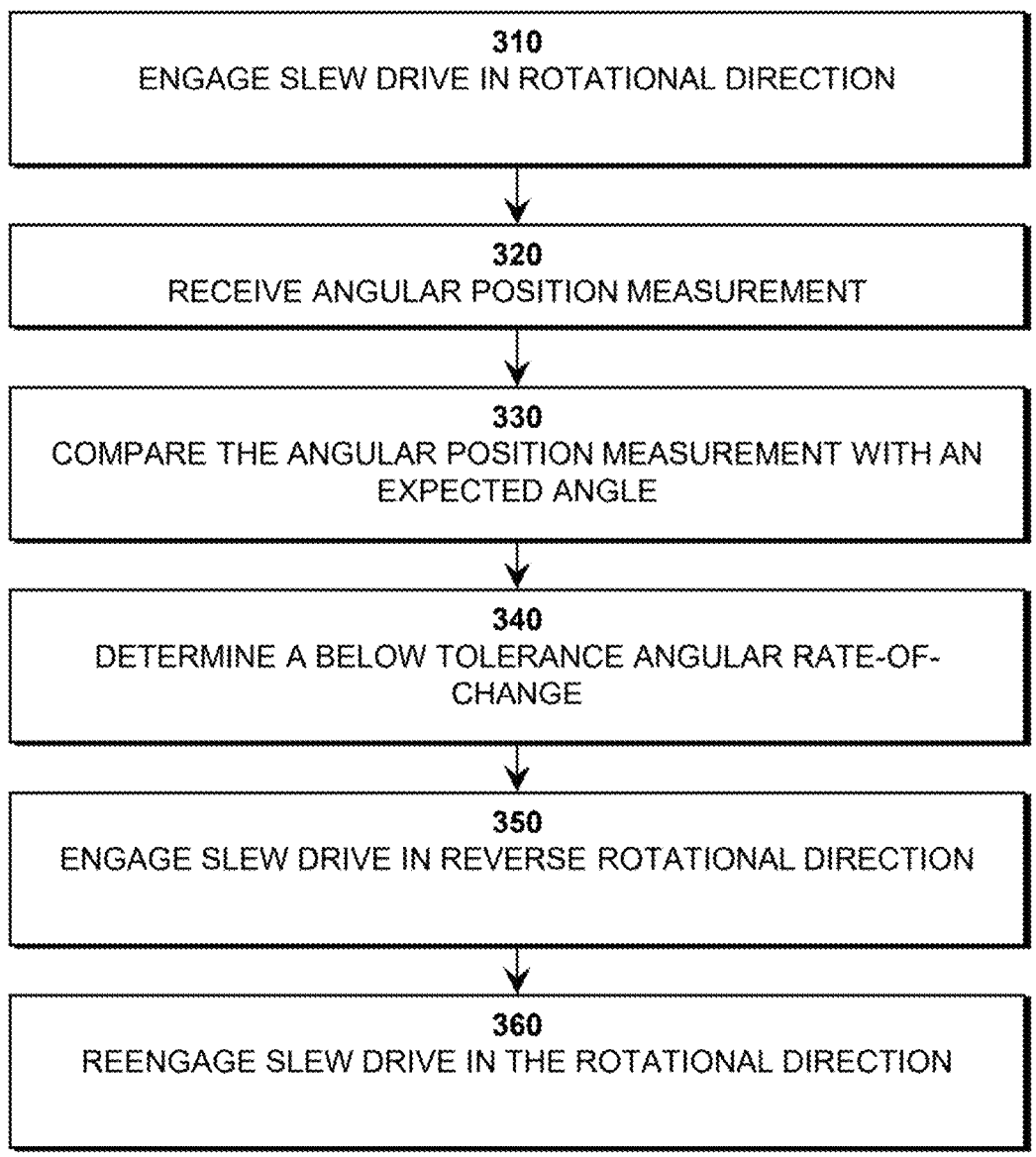
FIG. 3 depicts a flow diagram of a method, in accordance with one or more embodiments of the present disclosure.

Referring now to FIG. 3, a method 300 is described, in accordance with one or more embodiments of the present disclosure. The embodiments and the enabling technologies described previously herein in the context of the paving machine 100 and the slew drive 200 should be interpreted to extend to the method 300. For example, the method 300 may be implemented by the processor of the paving machine. In this regard, the processor may be considered to include sticky steering software which automatically detects if the track is not steering as intended and engage the slew drive in a reverse direction to relax the slew drive before returning to the original steer direction. It is further recognized, however, that the method 300 is not limited to the paving machine 100 or the slew drive 200.

In a step 310, a slew drive may be engaged in a rotational direction by supplying power from a power supply to the slew drive (e.g., hydraulic power or electric power). The power may include hydraulic power supplied from a hydraulic power supply or electric power supplied from an electric power supply. The slew drive may be engaged for changing an angle of a lower track section relative to a pivot arm. In this regard, the power may be supplied in response to receiving a steering command. The steering command may include changing the angle between zero and ninety degrees. For example, the lower track section may be changed from a zero-degree angle relative to the pivot arm up to a ninety-degree angle. In some embodiments, the steering command may be issued to assist in changing an angle of a pivot arm, as will be discussed further in reference to the method 500. In some embodiments, the steering command may be issued during on-the-go paving operations. Such on-the-go steering commands may be issued hundreds or thousands of times per day. Where the steering command is issued for on-the-go operations, the change in the angular position of the lower track section may be based on a steering limit. The steering limit may be based, at least in part, on the current speed of the paving machine. For example, the steering limits may be between zero and ninety degrees, or more. As the speed of the machine increases the steering limits may similarly decrease to a range of degrees (e.g., to a steering angle of between six and fifteen degrees).

In a step 320, an angular position measurement is received from an angle sensor. The angular position measurement may indicate the angle of the lower track section relative to the pivot arm. The angular position measurement may be determined by an angle sensor. For example, the angular position measurement may be determined with a frequency between 10 hertz and 20 hertz. Such angular position measurement may further be stored in a memory.

In a step 330, the angular position measurement is compared with an expected angle. In this regard, a difference between the angular position measurement and the expected angle may indicate an angular position error. The angular position error of the slew drive may then be compared with a position error tolerance. The comparison may indicate whether there is an error in positioning a component of a paving machine beyond tolerance. As may be understood, the position error tolerance may be selected based on a desired angular tolerance of the component. Depending on the component of the paving machine and the application of the paving machine, various tolerances may be desired. For example, a paving tolerance width may be set by contract. Controlling the lower track section and the pivot arm may indirectly or directly correspond to controlling the paving width. Similarly, the position error tolerance of the lower track section and the pivot arm may correspond directly or indirectly with the paving width tolerance. For example, a typical paving width tolerance may be plus or minus 3 millimeters (approximately $\frac{1}{8}^{th}$ of an inch) or less, with a position error tolerance for the lower track section and the pivot arm determined based on such tolerance.

In a step 340, a rate-of-change of the angle is determined to be below a rate-of-change tolerance. The rate-of-change tolerance may indicate a value such that the slew drive is not moving by a desired amount. The rate-of-change of the angle may be determined by finding the rate-of-change of the angular position measurements stored in the memory over a duration. In this regard, if the angular position measurements have had none to a minimal change for an amount of time, the slew drive may be considered seized or otherwise stuck. For example, the slew drive may lock-up within 500 milliseconds to one second. In this regard, computing the rate-of-change for a shorter duration of angular position measurements may be advantageous in more quickly determining the slew drive is beginning to lock-up, but may lead to false positives.

If the rate-of-change of the angle is above the tolerance, the slew drive may continue to be engaged in the desired direction. For example, the slew drive may be moving slower than expected, such that there is a position error, but where the slew drive is not seized such that the rate-of-change is above tolerance.

In some embodiments, the rate-of-change of the angle may be computed directly from the angular position measurements. In some embodiments, the rate-of-change of the angle is computed upon determining the difference between the angular position measurement and the expected angle indicates an angular position error. Computing the rate-of-change subsequent to determining the existence of a position error may reduce a computing requirement.

In a step 350, the slew drive is engaged in a reverse rotational direction for a time. The rotational direction of the slew drive may be reversed subsequent to determining the rate-of-change of the angular position measurement is below tolerance. For example, the rotational direction of the slew drive may be engaged in the reverse rotational direction by switching a valve such that a flow of hydraulic power supplied to a hydraulic powered motor of the slew drive is reversed. By way of another example, the rotational direction of the slew drive may be controlling a switching circuit to change the direction of current supplied to the slew drive. The time in which the slew drive is driven in the reverse direction may be dependent upon one or more of a speed of the drive gear actuator, a gear ratio of the drive gear to the ring gear, a backlash of the drive gear, or a backlash of the ring gear. For example, the slew drive may be driven in the reverse direction for 500 milliseconds to 650 milliseconds.

In a step 360, the slew drive may be reengaged in the rotational direction. Subsequent to being driven in the reverse direction, the slew drive may become un-seized. The drive gear actuator may then be engaged in the original rotational direction until the desired angular position is reached.

Optionally, where the rate-of-change remains below tolerance after the slew drive is re-engaged in the desired direction, the rotational direction of the slew drive may be reversed as needed. To prevent false positives, a delay may occur before reversing the rotational direction.

Although the method 300 is described as engaging the slew drive in the reverse rotational direction subsequent to determine the angular-rate-of-change is below a tolerance, this is not intended as a limitation on the present disclosure. In some embodiments, the slew drive may be engaged in a reverse rotational direction based on pressure measurements of the slew drive. For example, where the pressure measurement of the slew drive spikes above a maximum pressure tolerance, the slew drive may be engaged in a reverse direction. In this regard, the slew drive may be determined to be seized based upon measurements from one or more of the angle sensor or the pressure transducer, and based upon the determination, be engaged in the reverse rotational direction.

Figure 4A:
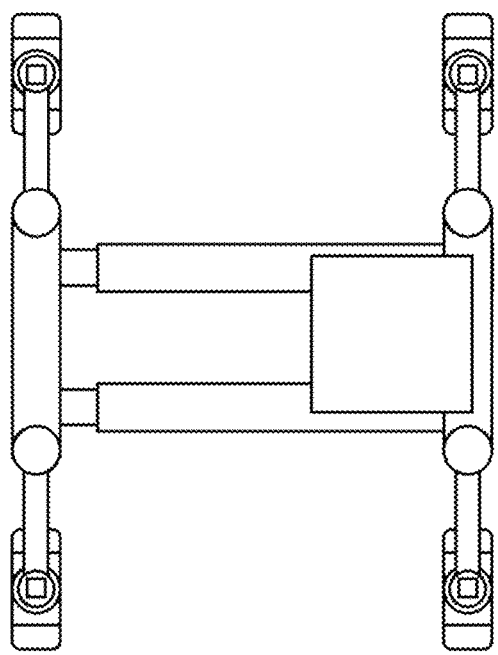
FIGS. 4A-4F depicts a simplified top view of the paving machine implementing the method of FIG. 3, in accordance with one or more embodiments of the present disclosure.
Figure 4B:
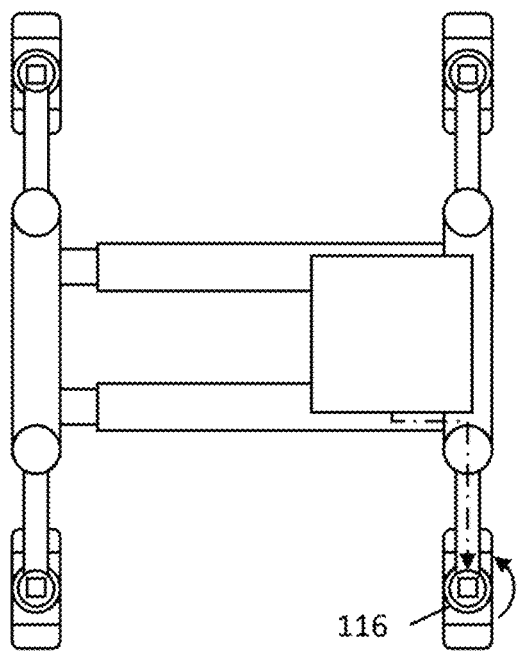
Figure 4C:
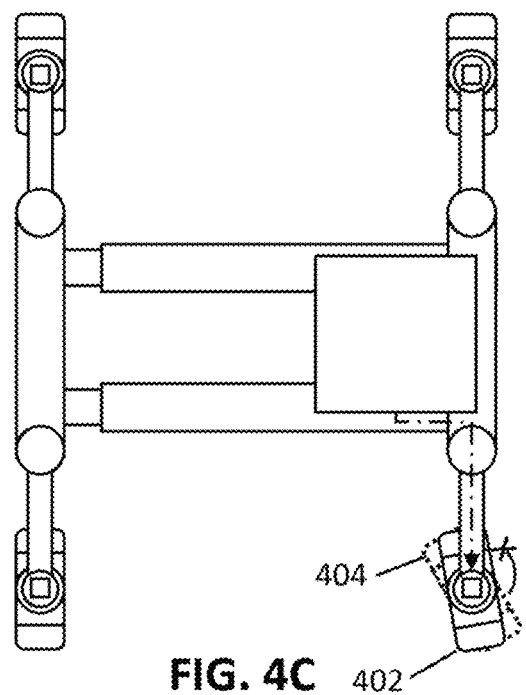
Figure 4D:
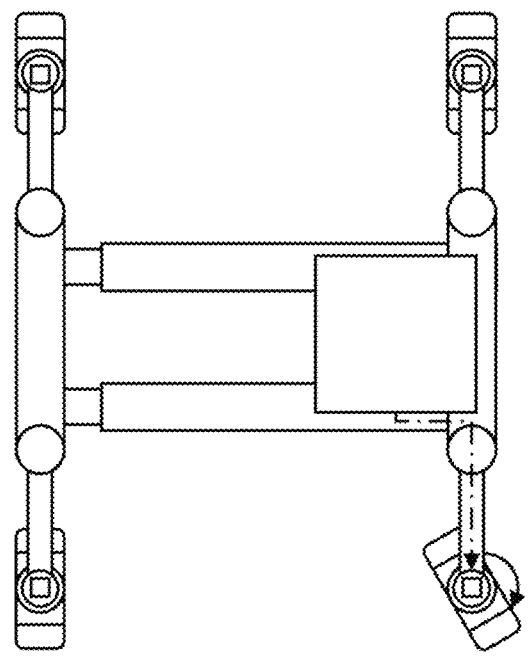
Figure 4E:
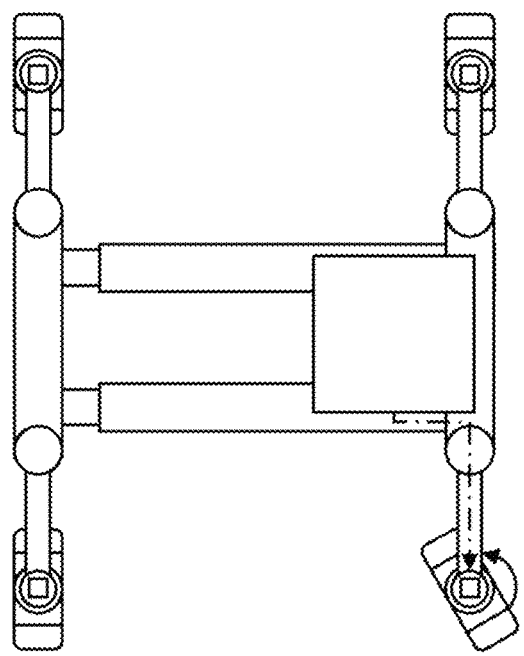
Figure 4F:
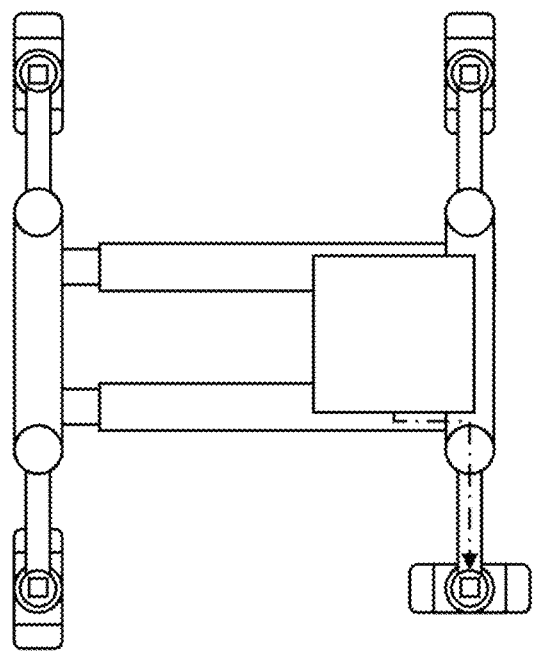

Referring now to FIGS. 4A-4G, an exemplary implementation of the method 300 is described, in accordance with one or more embodiments of the present disclosure. A steering command may be provided to change the track from a zero-degree steering angle to a ninety-degree steering angle. In some embodiments, the ninety-degree steering angle is provided to assist the pivot arm from the paving configuration (as depicted) to a transport configuration. In this regard, the track may be turned to the ninety-degree steering angle prior to engaging the track drive and the slew drive of the pivot arm for adjusting the angle of the pivot arm relative to the frame. Referring now to FIG. 4B, power is supplied from the power source 108 to the slew drive 112, causing the slew drive 116 to be engaged for changing the steering angle. Referring now to FIG. 4C, the measured angular position 402 may be at ten degrees while the expected angular position 404 may be at thirty degrees. The slew drive may stop at the angle for an amount of time, indicating the slew drive is seized. As may be understood, the specific exemplary degrees herein are merely provided to illustrate the difference between the expected and the actual angular positions. When implemented, the difference in position error before computing the angular rate-of-change may significantly less than the twenty-degree error depicted, such as, but not limited to, an error of one degree or less. Referring now to FIG. 4D, the slew drive 116 is then driven in the opposite direction for a time to unseize the slew drive. For example, the slew drive 116 may be driven in the opposite direction for between 500 millisecond and 650 milliseconds. Referring now to FIGS. 4E-F, the slew drive is then driven in the correct direction to achieve the desired steering angle.

Although the method 300 has been described for a slew drive for providing track steering, this is not intended as a limitation on the present disclosure. The method 300 may be applied for controlling slew drive 118 of the pivot arm 106. For example, the slew drive 118 may be engaged for changing an angle of the pivot arm 106 relative to the frame 102 (e.g., during width changes, pave-to-transport, or transport-to-pave). The method 300 may be applied to reduce a likelihood of the slew drive 118 becoming stuck. Where the method 300 is used for the slew drive 118 of the pivot arm 106, the method 300 may optionally include a step of controlling the track drive 120 of the lower track section 114. In this regard, the slew drive 118 and the track drive 120 may be engaged simultaneously, such that the track drive 120 may assist the slew drive 118 in rotating the pivot arm 106. Upon detecting that an angular-rate-of change of slew drive 118 is below tolerance, the slew drive 118 and the track drive 120 may be engaged in the reverse direction for the time. The slew drive 118 may then become unseized. The pivot arm slew drive and the track drive may then be re-engaged in the desired direction until a desired angle of the pivot arm 106 relative to the frame 102 is achieved.

Figure 5A:
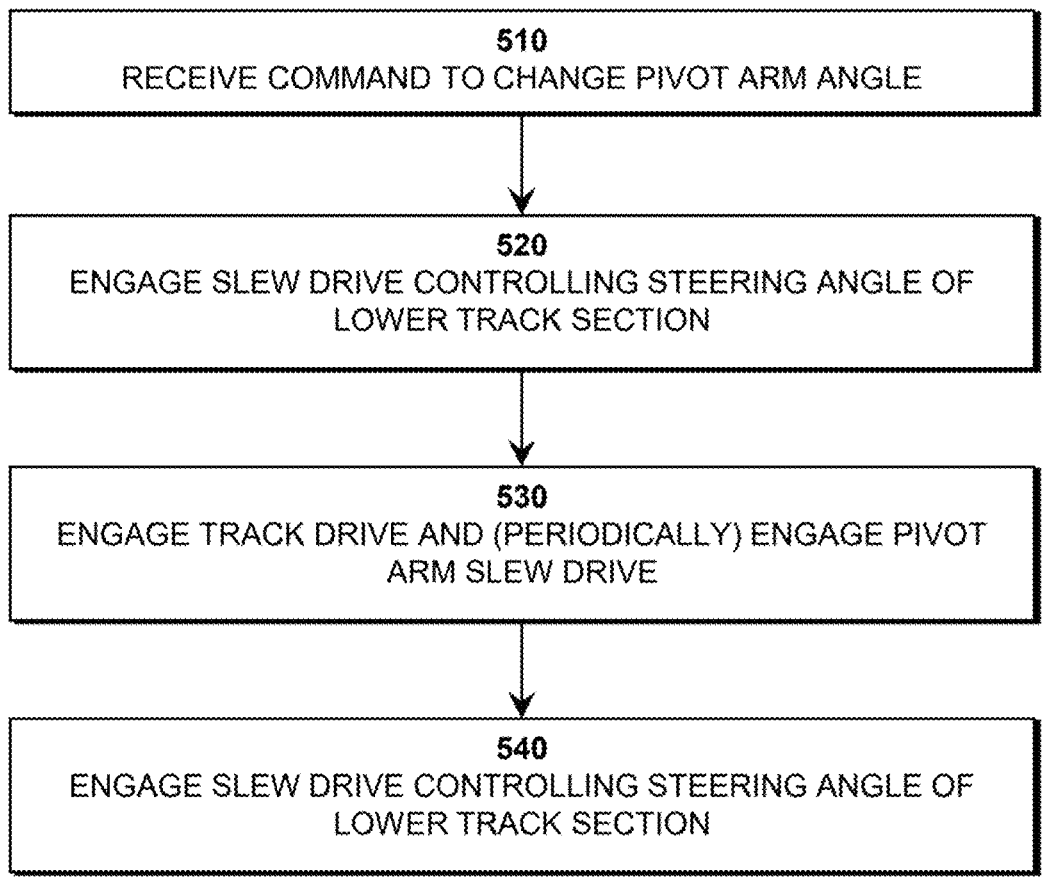
FIGS. 5A-5B depicts a flow diagram of a method, in accordance with one or more embodiments of the present disclosure.

Referring now to FIG. 5, a method 500 is described, in accordance with one or more embodiments of the present disclosure. The embodiments and the enabling technologies described previously herein in the context of the paving machine 100, the slew drive 200, and the method 300 should be interpreted to extend to the method 500. It is further recognized, however, that the method 500 is not limited to the paving machine 100, the slew drive 200, and the method 300.

In a step 510, a command is received to change an angle of the pivot arm. For example, the command may include one or more of a command to a change the pivot arm from a paving configuration to a transport configuration, from a transport configuration to a paving configuration, or an on-the-go width change.

In a step 520, the slew drive controlling the steering angle of the lower track section may be engaged. The steering angle may then be selectively controlled to a desired position. For example, where the command is to change the angle of the pivot arm from a paving configuration to a transport configuration, the slew drive (e.g., slew drive 116) may be engaged to turn the track substantially 90 degrees relative to the pivot arm. Where the track is substantially 90 degrees relative to the pivot arm, the track drive may provide assistance to the slew drive in rotating the pivot arm. By way of another example, the command may include an on-the-go steering reconfiguration (e.g., for changing a paving width). The steering angle may be based on one or steer limits. The steer limits may include a numerical value by which the machine may continue to provide track motion without skipping, such as, but not limited to, a range from 6 degrees to 15 degrees. The steering limits may be derived from a speed of the machine. Where the steer limit is less than a minimum value due to a rapid machine movement (e.g., 6 degrees), on-go-pivot movement may be disabled.

While the pivot arm is being adjusted on-the-go, an initial delay may be provided to the pivot arm slew drive, to allow the slew drive to provide a rotation of the track. The initial track rotation may reduce a likelihood the pivot arm slew drive becomes stuck. For example, the initial delay may allow a portion of the steering limits to be reached (e.g., up to nine degrees). The remainder of the steering limits may be subsequently applied while the pivot arm is rotated. Such delay may reduce machine movement when the track steers at slow travel speeds due to a larger steering limit at slower track speed. For example, the delay may include any suitable time, such as, but not limited to a two second delay or less.

In some embodiments, one or more steps of the method 300 is performed while the slew drive of the track is engaged in the step 520. In this regard, the angle of the slew drive may be controlled while preventing the slew drive from becoming stuck.

In a step 530, a track drive and slew drive controlling an angle of a pivot arm relative to a frame are engaged. The slew drive (e.g., slew drive 118) and the track drive may be engaged by suppling power from a power source (e.g., hydraulic power or electric power). By engaging the pivot arm slew drive and the track drive, an angle of the pivot arm relative to a frame may be adjusted. In this regard, the track drive may assist the pivot arm slew drive, thereby reducing a required output torque of the pivot arm slew drive. The step 530 may repeat until the pivot arm angle is at a desired angle. In this regard, an angle of the pivot arm relative to the frame may be received. The angle may then be compared with the desired pivot arm angle. Where the angle of the pivot arm relative to the frame does not conform with a desired angle, the step 530 may be repeated. The angle of the pivot arm may be received from one or more sensors, such as, but not limited to, an angle sensor which is configured to determine angular position measurements.

In some embodiments, one or more of the pivot arm slew drive and the track drive is continuously engaged. In some embodiments, the pivot arm slew drive is periodically engaged. In this regard, hydraulic power from the hydraulic power source may be provided to the slew drive with a period of on-times and a period of off-times. As may be understood, the slew drive may be engaged periodically by one or more valves between the hydraulic power supply and the slew drive. Such valve may include any hydraulic valve, such as, but not limited to, an Eaton CMA valve or a D03 valve. The period of on-times and off-times may include any suitable range, such as, but not limited to, on-times from 500 milliseconds to 1000 and off-times from 250 milliseconds to 500 milliseconds. The periodic engagement may provide a dither to the pivot slew motor valve drive when moving the pivot while the machine is traveling. The dither is particularly beneficial where the pivot arm is trailing the current direction of travel. When adjusting the angle of the pivot arm on-the-go, trailing pivots (i.e., a pivot trailing behind the direction of travel) the slew drive of the trailing pivot may become stuck more frequently. Particularly, the slew drive may become stuck more frequently when the pivot arm is coming from a wide position to a narrow position (e.g., when reducing a paving width or changing from a transport-to-pave configuration). The increased probability of slew sticking may occur because there is a reduced tangential force from the track helping the pivot arm drive inward. In some embodiments, the track speed is reduced below the speed of the paving machine to create a force pulling the pivot arm inwards. In this regard, the power supplied to the track drive may be reduced for reducing the track speed. Similarly, the track speed may be increased above the speed of the paving machine by suppling additional power to the track drive.

In a step 540, the slew drive of the track is engaged. The slew drive may be engaged to adjust the angle of the track relative to the pivot arm. In this regard, the angle of the track may have been previously adjusted to a helper angle in the step 510 (e.g., a helper angle between 6 degrees and 15 degrees while on-the-go, a helper angle of up to 90 degrees or more while stationary). To resume operations, the angle of the track may be repositioned to 6 degrees or less relative to the pivot arm.

In some embodiments, the method 500 may be performed simultaneously for multiple pivot arms of a paving machine. For example, where the paving machine includes two leading pivot arms and two trailing pivot arms, an angle of one of the leading pivot arms and an angle of one of the trailing pivot arms may be simultaneously adjusted. The other leading pivot arm and the other trailing pivot arm may provide stabilization for the paving machine. Thus, an angle of one front pivot arm and one rear pivot arm may be adjusted simultaneously while the machine is traveling. In this regard, angular adjustments of opposing leading pivot arms or opposing trailing pivot arms may be disabled while on-the-go.

In some embodiments, the method 500 may be simultaneously performed for one or more pivot arms. In this regard, the paving machine may include several pivot arms which may each be angularly repositioned relative to the frame. For example, during a reconfiguration of the paving machine (e.g., pave-to-transport, transport-to-pave) a first pivot arm and a second pivot arm may be engaged, where the second pivot arm is diagonally opposed to the first pivot (i.e., for a four-track paver). In this regard, the diagonally opposed pivot arms may be engaged while a third pivot arm and a fourth pivot arm remain stationary, where such third and fourth pivot arms are adjacent to both the first and second pivot arms. Such third and fourth pivot arms may provide support to the paving machine, effectively braking the paving machine from inadvertent movement. As may be understood, there may be alternative engagements of multiple pivot arms which provide braking of the paving machine during reconfiguration, such as, but not limited to, engaging adjacent pivot arms or engaging all but one of the pivot arms.

Although the method 500 generally described controlling power supplied to one or more of the slew drive of the pivot arm or the track drive based on hydraulic pressure measurements, this is not intended as a limitation on the present disclosure. In this regard, the power supplied to one or more of the slew drive of the pivot arm or the track drive may be controlled based on one or more of the angular velocity of the pivot arm or the velocity of the track drive. Thus, the slew drive and the track drives may be monitored to anticipate a need for a change in rate or direction of a single drive or a set of drives in a programmed choreographed position, configuration, or steering change.

Figure 5B:
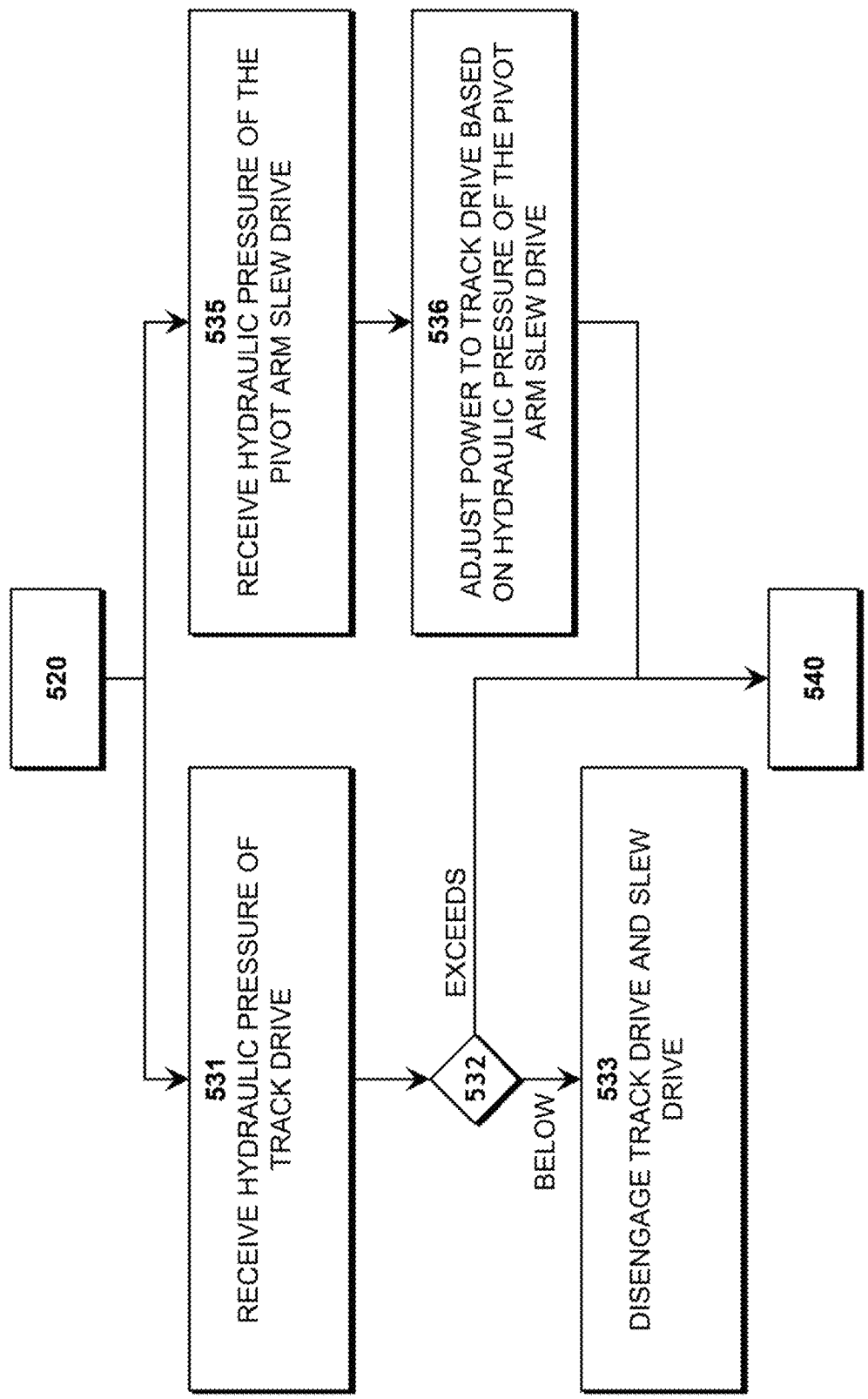

Referring now to FIG. 5B, the step 530 is further described, in accordance with one or more embodiments of the present disclosure. The step 530 may include one or more steps which occur while the track drive and the pivot arm slew drive are engaged to change the angle of the pivot arm relative to the frame. Such steps may reduce a likelihood that the slew drive of the pivot arm becomes stuck.

In a step 531, a hydraulic pressure of the track drive may be received. The hydraulic pressure may be received from a pressure transducer.

In a step 532, the hydraulic pressure of the track drive may be compared with a maximum track drive hydraulic pressure. The comparison may determine whether to continue supplying hydraulic power to the track drive and the pivot arm slew drive. The maximum track drive hydraulic pressure may include any suitable range of hydraulic pressures. The maximum track drive hydraulic pressure may be determined based, at least in part, upon a moment arm length of the pivot arm. For example, the maximum track drive hydraulic pressure may include a value between 1750 pounds per square inch and 2500 pounds per square inch. If the track drive is below the maximum track drive hydraulic pressure power may continue to be supplied and the track drive and the slew drive may continue to be engaged until the pivot arm reaches a desired angle.

In a step 533, if the track drive is above the maximum track drive the power supplied to the track drive and the pivot arm slew drive may be removed. By removing the power, the track drive and the pivot arm slew drive to be disengaged. While attempting to swing the pivot arm (e.g., from pave-to-transport, transport-to-pave) with track assistance and the track pressure exceeds the maximum track hydraulic pressure, the swinging movement will be stopped. A notification may be provided to an operator. The operator may then perform a visual inspection to determine why the track pressure exceeded the limit. By controlling the maximum track drive pressure, the track drive may be prevented from overdriving the pivot arm slew drive, causing the pivot arm slew drive to lock-up or experience component failure.

In a step 535, a hydraulic pressure of the pivot arm slew drive is received. The hydraulic pressure may be received from a pressure transducer. Similarly, where the slew drive is powered by an electric power source, one or more of a voltage reading or a current reading may be received.

In a step 536, the power of the track drive is adjusted based on the hydraulic pressure of the pivot arm slew drive. In this regard, the hydraulic pressure of the pivot arm slew drive is compared with a desired pivot arm slew drive hydraulic pressure. The desired pivot arm slew drive hydraulic pressure may include any suitable value. For example, the desired pivot arm slew drive hydraulic pressure may include a pressure range from 1000 pounds per square inch to 1500 pounds per square inch. In embodiments, the desired pivot arm slew drive hydraulic pressure is determined based upon a type of valve. For example, the valve may include any suitable type, such as, but not limited to, an Eaton CMA valve or a D03 valve. The hydraulic power supplied to the track drive is adjusted based upon the hydraulic pressure of the pivot arm slew drive based on the comparison. For example, the track drive hydraulic pressure may be reduced upon determining the hydraulic pressure of the pivot arm slew drive is above the desired pivot arm slew drive hydraulic pressure. In this regard, by reducing the hydraulic power supplied to the track drive, a likelihood of the pivot arm slew drive becoming jammed, seized, or otherwise stuck may be reduced. If the pivot slew is doing too much work, the slew drive is more likely to become stuck. By way of another example, the track drive hydraulic pressure may be increased upon determining the hydraulic pressure of the pivot arm slew drive is below the desired pivot arm slew drive hydraulic pressure. In this regard, by increasing the hydraulic power supplied to the track drive, the track drive may provide additional assistance for the slew drive in changing the angle of the pivot arm relative to the frame. Thus, the hydraulic pressure to the pivot arm slew drive may be controlled by selectively adjusting a hydraulic pressure of the track drive. In this regard, a control loop may match the track speed to pivot speed while driving the pivot (e.g., from pave to transport) while the pivot arm supports weight of the machine.

Referring generally again to FIGS. 1A-5.

In the case of a control algorithm, one or more program instructions or methods may be configured to operate via proportional control, feedback control, feedforward control, integral control, proportional-derivative (PD) control, proportional-integral (PI) control, proportional-integral-derivative (PID) control, or the like.

Although the angle of the pivot arm 106 relative to the frame 102 or the angle of the lower track section 114 relative to 106 is described as being controlled by one or more slew drives, this is not intended as a limitation of the present disclosure. In some embodiments, one or more of the pivot arm 106 relative to the frame 102 or the steering angle of the lower track section 114 may be controlled by a planetary drive (not depicted). For example, the planetary drive may include a motor. The planetary drive may include a planetary gearset driven by such motor. By engaging the planetary gearset, the planetary drive may control an angular position of the pivot arm 106 or the steering angle of the lower track section. In some embodiments, the motor of the planetary drive is selectively controlled based on one or more sensors. For example, a rotary sensor may detect rotations of the motor. By determining the rotations of the motor, a corresponding angular position of the pivot arm 106 or the steering angle of the lower track section may be computed (i.e., based on the associated gear ratio of the planetary drive). By way of another example, the sensor may include a pressure sensor. The pressure sensor may determine a pressure of the hydraulic drive. Based on one or more of the pressure sensor or the rotary sensor, the planetary drive may be selectively controlled to adjust the pivot arm 106 or the steering angle of the lower track section.

For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory).

Furthermore, the memory may include any storage medium known in the art suitable for storing program instructions executable by the associated one or more processors. For example, the memory medium may include a non-transitory memory medium. By way of another example, the memory medium may include, but is not limited to, a read-only memory (ROM), a random-access memory (RAM), a magnetic or optical memory device (e.g., disk), a solid-state drive and the like. It is further noted that memory medium may be housed in a common controller housing with the one or more processors. In one embodiment, the memory medium may be located remotely with respect to the physical location of the one or more processors.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory. It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "front," "back," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:
1. A paving machine comprising:
a frame including a slip-form for moving in a first direction of travel for forming a material into shape;
at least one end structure supporting at least a portion of the frame, the end structure including a height adjustable leg assembly for adjusting a height of the frame relative to ground, the end structure further including a lower track section with a track drive for propelling the frame in the first direction, the end structure further including a first slew drive, wherein the first slew drive includes at least one of an angle sensor or a pressure transducer;
a pivot arm pivotably connecting the end structure to the frame;
a power supply connected to at least the track drive and the first slew drive for supplying power to the track drive and the first slew drive;
a processor configured, via executable code, to:
engage the first slew drive in a rotational direction for changing an angle of the lower track section relative to the pivot arm by supplying power from the power supply to the first slew drive;
determine the slew drive is seized based on measurements from at least one of the angle sensor or the pressure transducer; and
engage the first slew drive in a reverse rotational direction for a time.

2. The paving machine of claim 1, wherein the processor is configured to determine the slew drive is seized by:
receiving the angle of the lower track section relative to the pivot arm from the angle sensor; and
determining that a rate-of-change of the angle is below a rate-of-change tolerance.

3. The paving machine of claim 1, wherein the time is between 500 milliseconds and 650 milliseconds.

4. The paving machine of claim 1, wherein the slew drive includes a motor configured to receive the power from the power supply, a drive gear coupled to the motor, a ring gear driven by the drive gear, a housing receiving at least the drive gear, and at least one bushing interfacing between the housing and the drive gear.

5. The paving machine of claim 4, wherein the bushing comprises an aluminized bronze material.

6. The paving machine of claim 5, wherein the aluminized bronze material consists essentially of a chemical composition by weight of between 10 percent aluminum to 11.5 percent aluminum, at least 83 percent copper, between 3 percent iron to 5 percent iron, 0.5 percent manganese, and 1.5 percent nickel.

7. The paving machine of claim 1, wherein the pivot arm is pivotably connected to the frame by a second slew drive, wherein the processor is further configured to engage the track drive and the second slew drive by supplying power from the power supply to the track drive and the second slew drive for changing an angle of the pivot arm relative to the frame when the end structure supports the portion of the frame.

8. The paving machine of claim 7, wherein prior to engaging the track drive and the second slew drive, the angle of the lower track section relative to the pivot arm is changed to a substantially ninety-degree angle for reducing a torque requirement of the second slew drive when changing the angle of the pivot arm relative to the frame.

9. The paving machine of claim 7, wherein the second slew drive includes a pressure transducer configured to measure a pressure of the second slew drive, wherein the processor is further configured to:
receive the pressure of the second slew drive from the pressure transducer; and
initiate at least one of:
reduce the power supplied to the track drive upon determining the pressure of the second slew drive is above a desired pressure of the second slew drive; or
increase the power supplied to the track drive upon determining the pressure of the second slew drive is below the desired pressure of the second slew drive.

10. The paving machine of claim 9, wherein the desired pressure of the second slew drive is between 1000 pounds per square inch and 1500 pounds per square inch.

11. The paving machine of claim 7, wherein the track drive includes a pressure transducer configured to measure a pressure of the track drive, wherein the processor is further configured to:
receive the pressure of the track drive from the pressure transducer;
determine the pressure of the track drive exceeds a maximum track drive pressure; and
disengage the track drive and the second slew drive.

12. The paving machine of claim 11, wherein the maximum track drive pressure is between 1750 pounds per square inch and 2500 pounds per square inch.

13. The paving machine of claim 7, wherein the processor is further configured to periodically engage the second slew drive with an on-time and an off-time when changing the angle of the pivot arm relative to the frame.

14. The paving machine of claim 13, wherein the on-time is between 500 milliseconds and 1000 milliseconds, wherein the off-time is between 250 milliseconds and 1500 milliseconds.

15. The paving machine of claim 13, wherein the pivot arm is trailing behind the first direction of travel.

16. The paving machine of claim 7, wherein the frame is at least one of stationary or moving in the first direction of travel while the angle of the pivot arm relative to the frame is changed.

17. A method of reducing component failure in a paving machine, the method comprising the steps of:
engaging a first slew drive in a rotational direction for changing an angle of a lower track section relative to a pivot arm by supplying power from a power supply to the first slew drive;
determining the first slew drive is seized based on measurements from at least one of an angle sensor or a pressure transducer; and
engaging the first slew drive in a reverse rotational direction for a time.

18. The method of claim 17, wherein determining the first slew drive is seized based on measurements from at least one of an angle sensor or a pressure transducer comprises:
receiving the angle of the lower track section relative to the pivot arm from the angle sensor; and
determining that a rate-of-change of the angle is below a rate-of-change tolerance.

19. The method of claim 17, further comprising:
engaging a track drive and a second slew drive by supplying power from the power supply to the track drive and the second slew drive for changing an angle of the pivot arm relative to a frame when an end structure supports a portion of the frame.

20. The method of claim 19, further comprising:
receiving a pressure of the second slew drive from a pressure transducer, the second slew drive connecting the pivot arm with the frame; and
at least one of:
reducing a power supplied to the track drive upon determining the pressure of the second slew drive is above a desired pressure of the second slew drive; or
increase the power supplied to the track drive upon determining the pressure of the second slew drive is below the desired pressure of the second slew drive.

21. The method of claim 19, further comprising:
determining a pressure of the track drive exceeds a maximum track drive hydraulic pressure; and
disengaging the track drive and the second slew drive.

22. The method of claim 19, wherein the second slew drive is engaged periodically with an on-time and an off-time.

23. The method of claim 22, wherein the on-time is between 500 milliseconds and 1000 milliseconds, wherein the off-time is between 250 milliseconds and 1500 milliseconds.

24. A paving machine comprising:
a frame including a slip-form for moving in a first direction of travel for forming a material into shape;
at least one end structure supporting at least a portion of the frame, the end structure including a height adjustable leg assembly for adjusting a height of the frame relative to ground, the end structure further including a lower track section with a track drive for propelling the frame in the first direction, the end structure further including a first slew drive, wherein the first slew drive includes an angle sensor;
a pivot arm pivotably connecting the end structure to the frame, wherein the pivot arm is pivotably connected to the frame by a second slew drive;
a power supply connected to at least the track drive, the first slew drive, and the second slew drive for supplying power to the track drive, the first slew drive, and the second slew drive;
a processor configured, via executable code, to:
receive a command to change an angle of the pivot arm relative to the frame;
determine a steer limit based on a current speed of the paving machine;
engage the first slew drive in a rotational direction for changing an angle of the lower track section relative to the pivot arm to the steer limit by supplying power from the power supply to the first slew drive;
receive the angle of the lower track section relative to the pivot arm from the angle sensor;
determine that a rate-of-change of the angle is below a rate-of-change tolerance;
engage the first slew drive in a reverse rotational direction for a time;
reengage the first slew drive in the rotational direction until the angle of the lower track section relative to the pivot arm reaches the steer limit; and
engage the track drive and the second slew drive to change the angle of the pivot arm relative to the frame.

25. The paving machine of claim 24, further comprising a first pressure transducer configured to measure a pressure of the second slew drive, wherein the processor is further configured to adjust the power supplied to the track drive based on the pressure of the second slew drive.

26. The paving machine of claim 24, wherein the second slew drive is periodically engaged with an on-time and an off-time.

27. The paving machine of claim 26, wherein the processor is further configured to adjust a speed of the track drive to dither the pivot arm.

28. The paving machine of claim 24, wherein the second slew drive further comprises a second angle sensor, wherein the processor is further configured to:
receive the angle of the pivot arm relative to the frame from the second angle sensor;
determine that a rate-of-change of the angle of the pivot arm relative to the frame is below a second rate-of-change tolerance;
engage the second slew drive and the track drive in a reverse rotational direction for a time; and
reengage the second slew drive and the track drive in the rotational direction until the angle of the pivot arm relative to the frame reaches a desired angle.

29. A method comprising:
receiving a command to change an angle of a pivot arm relative to a frame;
determining a steer limit based on a current speed of a paving machine;
engaging a first slew drive in a rotational direction for changing an angle of a lower track section relative to the pivot arm to the steer limit by supplying power from a power supply to the first slew drive;
receiving an angle of the lower track section relative to the pivot arm from an angle sensor;
determining that a rate-of-change of the angle of the lower track section relative to the pivot arm is below a rate-of-change tolerance;
engaging the first slew drive in a reverse rotational direction for a time;
reengaging the first slew drive in the rotational direction until the angle of the lower track section relative to the pivot arm reaches the steer limit; and
engaging a track drive of the lower track section and a second slew drive to change the angle of the pivot arm relative to the frame.

30. The method of claim 29, further comprising:
receiving an angle of the pivot arm relative to the frame from a second angle sensor;
determining that a rate-of-change of the angle of the pivot arm relative to the frame is below a second rate-of-change tolerance;
engaging the second slew drive and the track drive in a reverse rotational direction for a time; and
reengaging the second slew drive and the track drive in the rotational direction until the angle of the pivot arm relative to the frame reaches a desired angle.

\* \* \* \* \*